United States Patent
Takei

(10) Patent No.: US 8,269,841 B2
(45) Date of Patent: Sep. 18, 2012

(54) OPTICAL ELEMENT DRIVING DEVICE, OPTICAL ELEMENT BARREL, AND IMAGE PICKUP APPARATUS

(75) Inventor: Tomoya Takei, Fukuoka (JP)

(73) Assignee: Sony Corporation, Tokyo (JP)

( * ) Notice: Subject to any disclaimer, the term of this patent is extended or adjusted under 35 U.S.C. 154(b) by 208 days.

(21) Appl. No.: 12/923,010

(22) Filed: Aug. 30, 2010

(65) Prior Publication Data

US 2011/0102665 A1 May 5, 2011

(30) Foreign Application Priority Data

Oct. 29, 2009 (JP) ................................. 2009-248339

(51) Int. Cl.
*H04N 5/228* (2006.01)
(52) U.S. Cl. .................... 348/208.11; 396/554
(58) Field of Classification Search ............ 348/208.99, 348/208.2, 208.5, 208.7, 208.11, 208.13, 348/373; 359/824; 396/55, 13, 554
See application file for complete search history.

(56) References Cited

U.S. PATENT DOCUMENTS

| | | | |
|---|---|---|---|
| 5,266,988 A | | 11/1993 | Washisu |
| 7,342,733 B2 * | | 3/2008 | Takei .......................... 359/824 |
| 7,539,404 B2 * | | 5/2009 | Iwasaki et al. ................. 396/55 |
| 8,089,711 B2 * | | 1/2012 | Mitani ......................... 359/824 |
| 2008/0291540 A1 * | | 11/2008 | Nakamura et al. ............ 359/554 |
| 2010/0039718 A1 | | 2/2010 | Nishimiya et al. |
| 2011/0013029 A1 * | | 1/2011 | Akutsu et al. ............ 348/208.11 |

FOREIGN PATENT DOCUMENTS

| | | |
|---|---|---|
| JP | 03-188430 | 8/1991 |
| JP | 2796831 | 7/1998 |
| JP | 2000-194026 | 7/2000 |
| JP | 2006-345629 | 12/2006 |
| JP | 2008-197220 | 8/2008 |
| JP | 2009-168920 | 7/2009 |
| WO | WO-2008/038636 | 4/2008 |

* cited by examiner

*Primary Examiner* — Aung S Moe
(74) *Attorney, Agent, or Firm* — Rader Fishman & Grauer, PLLC

(57) ABSTRACT

An optical element driving device includes an optical element holder, first and second magnets, first and second magnetic bodies each having a cross section including a vertex and first and second legs forming an opening therebetween, first and second piezoelectric elements that move the optical element holder in directions perpendicular to each other by slidingly moving the first and second magnetic bodies by vibrating the first and second magnets, and first and second magnetic sensors that detect a position of the optical element holder, wherein the first and second piezoelectric elements are driven in a state in which the first and second magnets are coupled to the first and second legs from the opening side, wherein the first and second magnets are each magnetized in directions perpendicular to a magnetization line, and wherein the second magnetic sensor is disposed at a position that is not on the magnetization line.

5 Claims, 18 Drawing Sheets

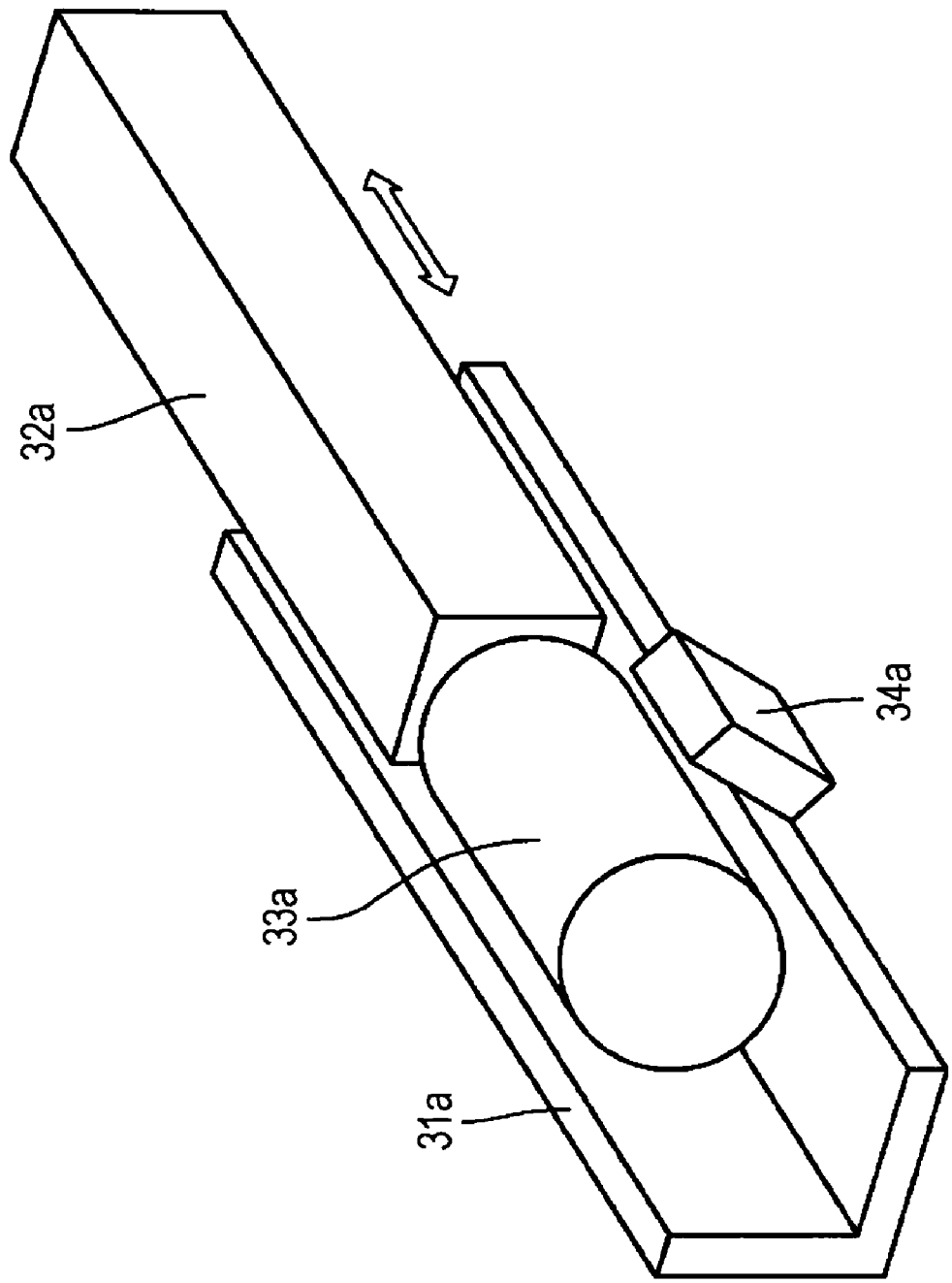

FIG. 6A
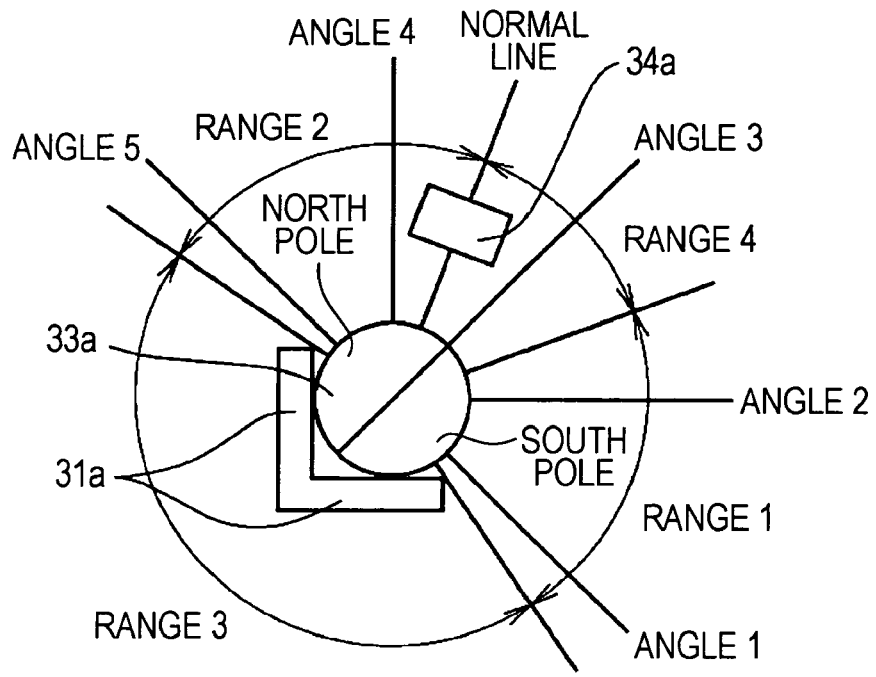
FIG. 6B
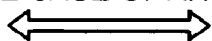
RELATIVE MOVEMENT RANGE OF
FIRST MAGNETIC SENSOR 34a
(IN THE CASE OF ANGLE 4)
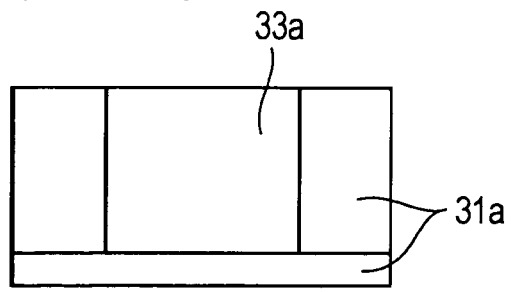

RELATIVE MOVEMENT RANGE OF
SECOND MAGNETIC SENSOR 34b

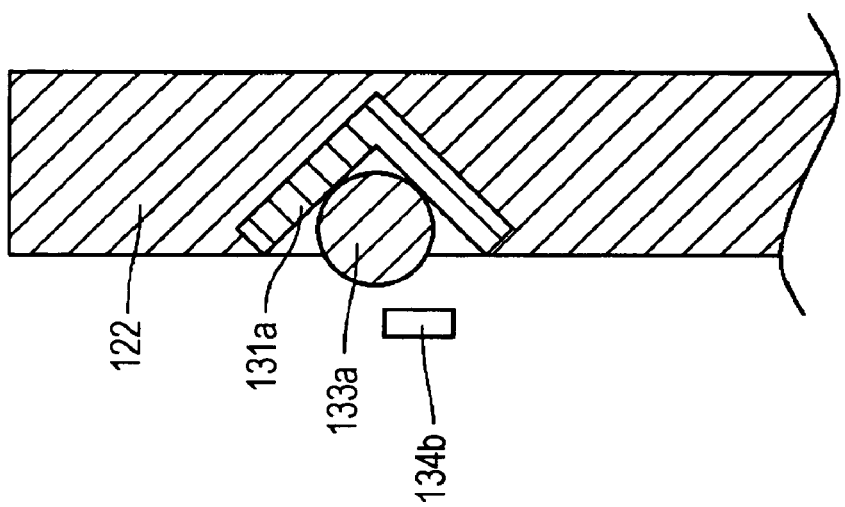
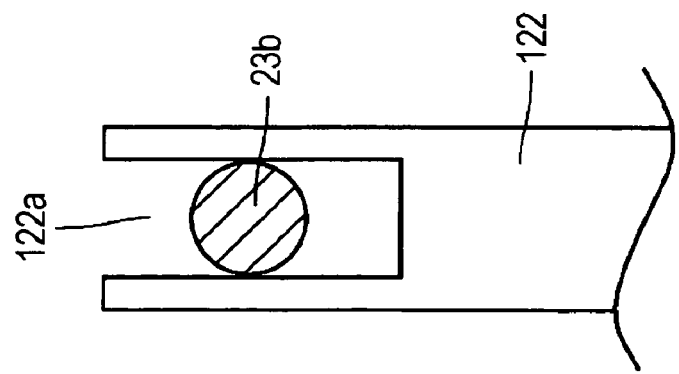

OPTICAL ELEMENT DRIVING DEVICE, OPTICAL ELEMENT BARREL, AND IMAGE PICKUP APPARATUS

BACKGROUND OF THE INVENTION

1. Field of the Invention

The present invention relates to an optical element driving device that moves an optical element holder by slidingly moving a magnetic body by vibrating a magnet with a piezoelectric element. The present invention also relates to an optical element barrel and an image pickup apparatus including the optical element driving device.

2. Description of the Related Art

Image pickup apparatuses, such as digital still cameras, digital video cameras, and the like, focus an image of an object by using an image-taking optical lens (optical element). An image pickup device, such as a charge coupled device (CCD) image sensor or a complementary metal oxide semiconductor (CMOS) image sensor, is disposed to the rear of the optical lens, and the image pickup device forms the image of the object.

In order to prevent degradation of an image due to shaking of such an image pickup apparatus, some digital still cameras and digital video cameras include an optical motion blur correction mechanism. To be specific, motion blur of an image is corrected by moving the optical lens in two directions that are perpendicular to the optical axis. As an optical element driving device for moving an optical lens, for example, a technology using an electromagnetic actuator including a coil and a magnet is comparatively widely used.

As an actuator for moving an optical lens, technologies using a piezoelectric element have been disclosed. For example, a technology using a bimorph piezoelectric element in order to move a lens for motion blur correction has been disclosed. Another technology uses a stack of piezoelectric ceramic plates in order to increase displacement of a piezoelectric element.

Another technology enables a driving force generated by a piezoelectric element to be stably transmitted to an optical element holder by using magnetic attraction between a magnet that is attached to the piezoelectric element and a magnetic body that is attached to an optical element holder that holds an optical lens.

SUMMARY OF THE INVENTION

However, the existing lens drive technologies that use a piezoelectric element, such as the technologies described in Japanese Unexamined Patent Application Publication No. 2000-194026 and Japanese Patent No. 2796831, do not include a detector for detecting the position of the optical lens that is moved by the piezoelectric element. Therefore, the precision of position detection is low.

Therefore, it is desirable to provide an optical element driving device having a high precision of position detection. It is also desirable to provide an optical element driving device that is small and that has good driving characteristics and a low power consumption.

According to an embodiment of the present invention, there is provided an optical element driving device including an optical element holder that holds an optical element; a first magnet for moving the optical element holder; a second magnet for moving the optical element holder in a direction that is perpendicular to a direction in which the first magnet moves the optical element holder; a first magnetic body and a second magnetic body each having a cross section including a vertex and first and second legs extending from the vertex, the first and second legs having substantially an identical shape and forming an opening therebetween; a first piezoelectric element that moves the optical element holder by slidingly moving the first magnetic body by vibrating the first magnet; a second piezoelectric element that moves the optical element holder by slidingly moving the second magnetic body by vibrating the second magnet; a first magnetic sensor that detects a position of the optical element holder that is moved by driving the first piezoelectric element; and a second magnetic sensor that detects a position of the optical element holder that is moved by driving the second piezoelectric element, wherein the first piezoelectric element is driven in a state in which the first magnet is coupled to the first and second legs of the first magnetic body from the opening side, and the second piezoelectric element is driven in a state in which the second magnet is coupled to the first and second legs of the second magnetic body from the opening side, wherein the first magnet is magnetized in a direction perpendicular to a magnetization line that is a straight line connecting the vertex of the first magnetic body and a center of a cross section of the first magnet, and the second magnet is magnetized in a direction perpendicular to a magnetization line that is a straight line connecting the vertex of the second magnetic body and a center of a cross section of the second magnet, and wherein the second magnetic sensor is disposed at a position that is not on the magnetization line in a cross-sectional view of the first magnetic body.

According to an embodiment of the present invention, there is provided an optical element barrel including the optical element driving device.

According to an embodiment of the present invention, there is provided an image pickup apparatus including the optical element driving device.

According to the embodiments of the present invention, the first piezoelectric element (the second piezoelectric element) moves the optical element holder by slidingly moving the first magnetic body (the second magnetic body) by vibrating the first magnet (the second magnet).

The second magnetic sensor detects the movement of the optical element holder, which is caused by the second piezoelectric element, by detecting the movement of the first magnet due to the movement of the optical element holder.

According to the embodiments of the present invention, the position of the optical element holder that is moved by the second piezoelectric element can be accurately detected by detecting the movement of the first magnet due to the movement of the optical element holder with the second magnetic sensor.

BRIEF DESCRIPTION OF THE DRAWINGS

FIG. 5 is a perspective view of a main part of a lens driving mechanism, which is an optical element driving device according to an embodiment of the present invention;

FIGS. 6A and 6B illustrate the relationship between the position of a first magnetic sensor and the position of a first magnet in the optical element driving device according to the embodiment of the present invention;

FIGS. 18A and 18B are cross-sectional views of the optical element driving unit illustrated in FIG. 17, respectively taken along lines XVIIIA-XVIIIA and XVIIIB-XVIIIB.

DESCRIPTION OF PREFERRED EMBODIMENTS

Hereinafter, embodiments of the present invention will be described with reference to the drawings.

In the following description, an image pickup apparatus according to an embodiment of the present invention is a digital still camera 10. An optical element barrel according to an embodiment of the present invention is a lens barrel 20 or the like included in the digital still camera 10. An optical element driving device according to an embodiment of the present invention is included in the lens barrel 20 or the like.

Description will be made in the following order.
1. First Embodiment (an example structure of an optical element driving device)
2. Second embodiment (another example structure of an optical element driving device)

Example of External View of Image Pickup Apparatus

Figure 1:
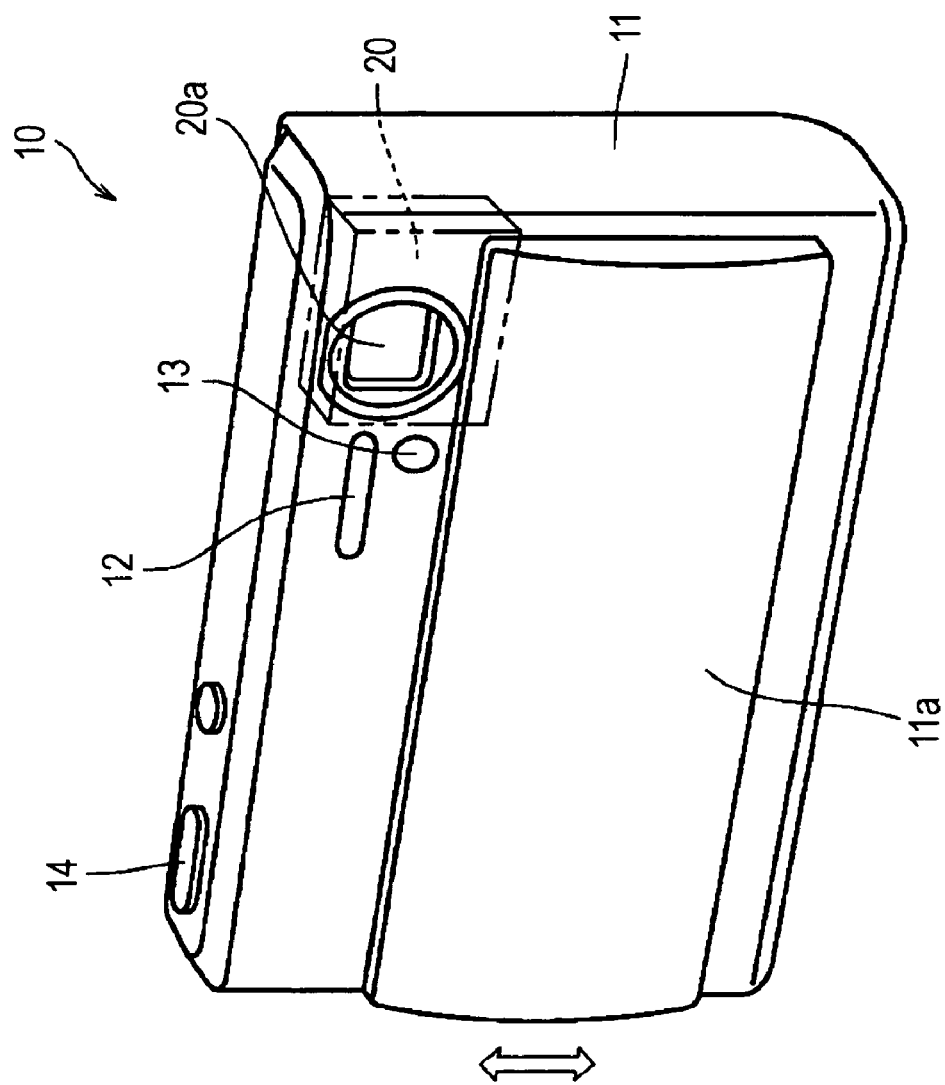
FIG. 1 is a perspective view of the front side of a digital still camera, which is an image pickup apparatus according to an embodiment of the present invention.

FIG. 1 is a perspective view of the front side of the digital still camera 10, which is an image pickup apparatus according to an embodiment of the present invention.

Figure 2:
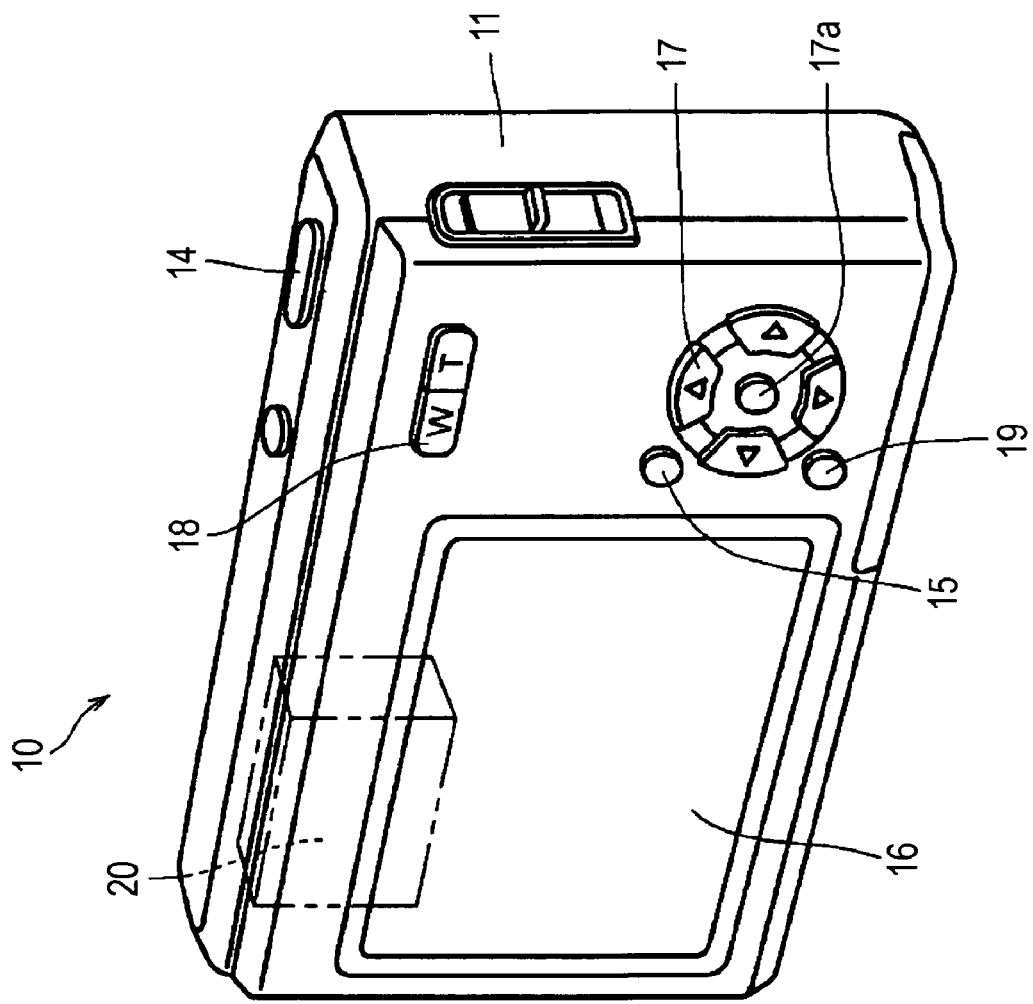
FIG. 2 is a perspective view of the rear side of the digital still camera, which is an image pickup apparatus according to an embodiment of the present invention.

FIG. 2 is a perspective view of the rear side of the digital still camera 10, which is an image pickup apparatus according to an embodiment of the present invention.

As illustrated in FIG. 1, the digital still camera 10 includes a body 11, which is a rectangular-parallelepiped casing. As shown by a double-dotted chain line in FIG. 1, the lens barrel 20 (corresponding to an optical element barrel) is installed in an upper right part of the body 11. A lens 20a is disposed in a barrel body of the lens barrel 20 so that the lens 20a is positioned in an upper front part of the body 11.

Regarding the digital still camera 10 illustrated in FIGS. 1 and 2, left and right directions are the left and right directions when viewed from the front side of FIG. 1.

A flash 12, which emits fill light, and an auto focus (AF) auxiliary light emitter 13 are disposed to the left side of the lens 20a. A shutter button 14 is disposed on a left part of the upper surface of the body 11. A cover 11a is disposed on the front side of the body 11. The cover 11a can be moved between an image-taking position and a protection position as indicated by arrows. In the image-taking position, the cover 11a is positioned on a lower front side of the body 11 so that the lens 20a, the flash 12, and the AF auxiliary light emitter 13 are exposed to the outside. In the protection position, the cover 11a is positioned on an upper front side of the body 11 so as to cover the lens 20a, the flash 12, and the AF auxiliary light emitter 13. Thus, by pressing the shutter button 14 when the cover 11a is in the image-taking position (the position illustrated in FIG. 1), image-taking can be performed.

As illustrated in FIG. 2, a menu button 15, a display 16, arrow keys 17, a zoom lever 18, and an exposure correction button 19 are disposed on the rear side of the body 11. By operating the menu button 15, various menus (that allows ON/OFF of a still camera mode, a video camera mode, a playback mode, a motion blur correction mode, etc.) can be displayed on the display 16 (for example, a liquid crystal display). Displayed menu items can be selected by pressing the arrow keys 17, and the selected setting can be entered by pressing an enter button 17a. In addition to the setting menus, the display 16 can also display an image to be taken and play back images that have been taken. Moreover, zooming (change in magnification) can be performed by operating the zoom lever 18. Exposure correction, such as backlight correction, can be performed with one-touch operation using the exposure correction button 19.

1. First Embodiment

Example Structure of Optical Element Driving Unit of Optical Element Barrel

Figure 3:
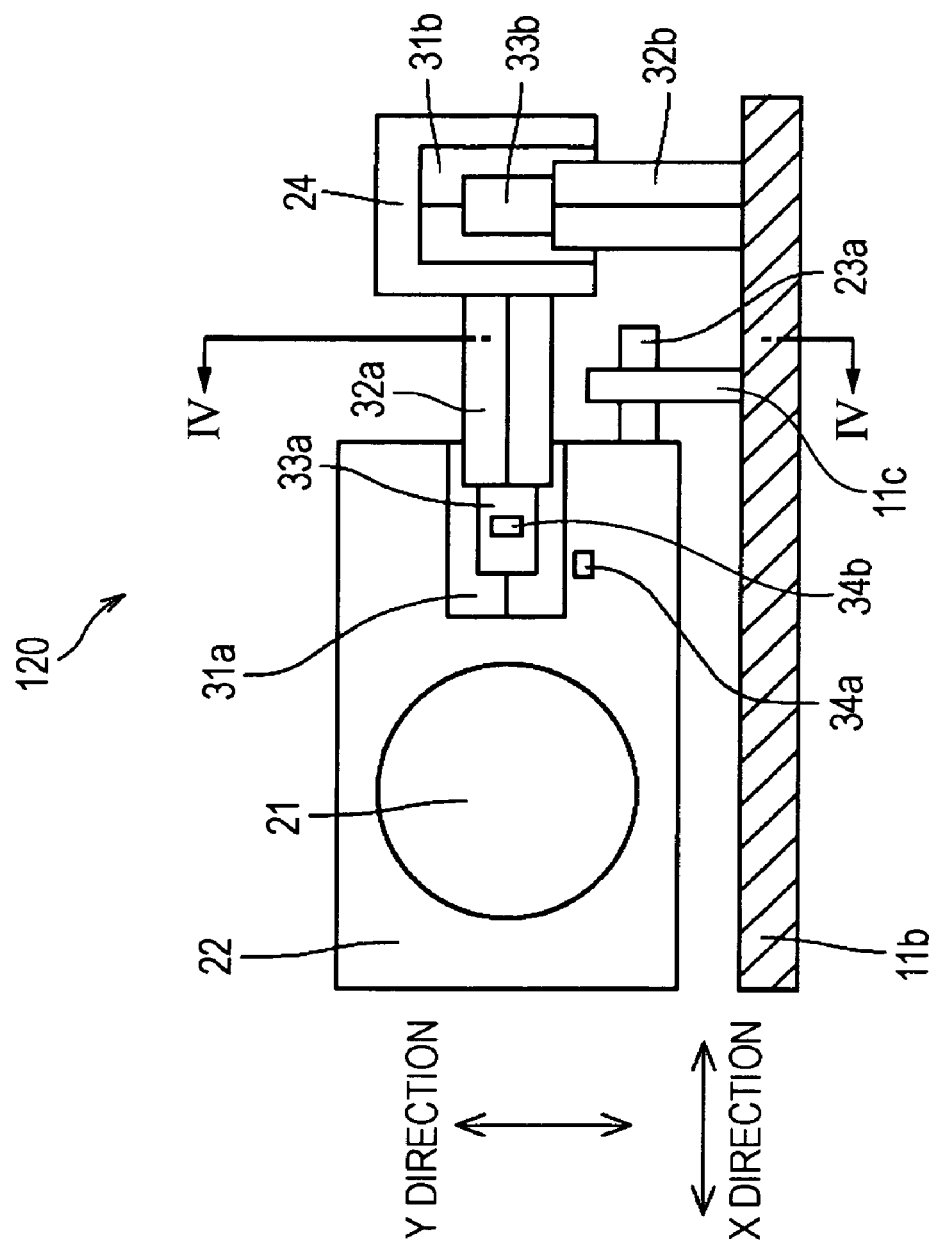
FIG. 3 is a front view of an optical element driving unit of a lens barrel, which is an optical element barrel according to an embodiment (first embodiment) of the present invention.

FIG. 3 is a front view of an optical element driving unit 120 of a lens barrel, which is an optical element barrel according to an embodiment (first embodiment) of the present invention.

Figure 4:
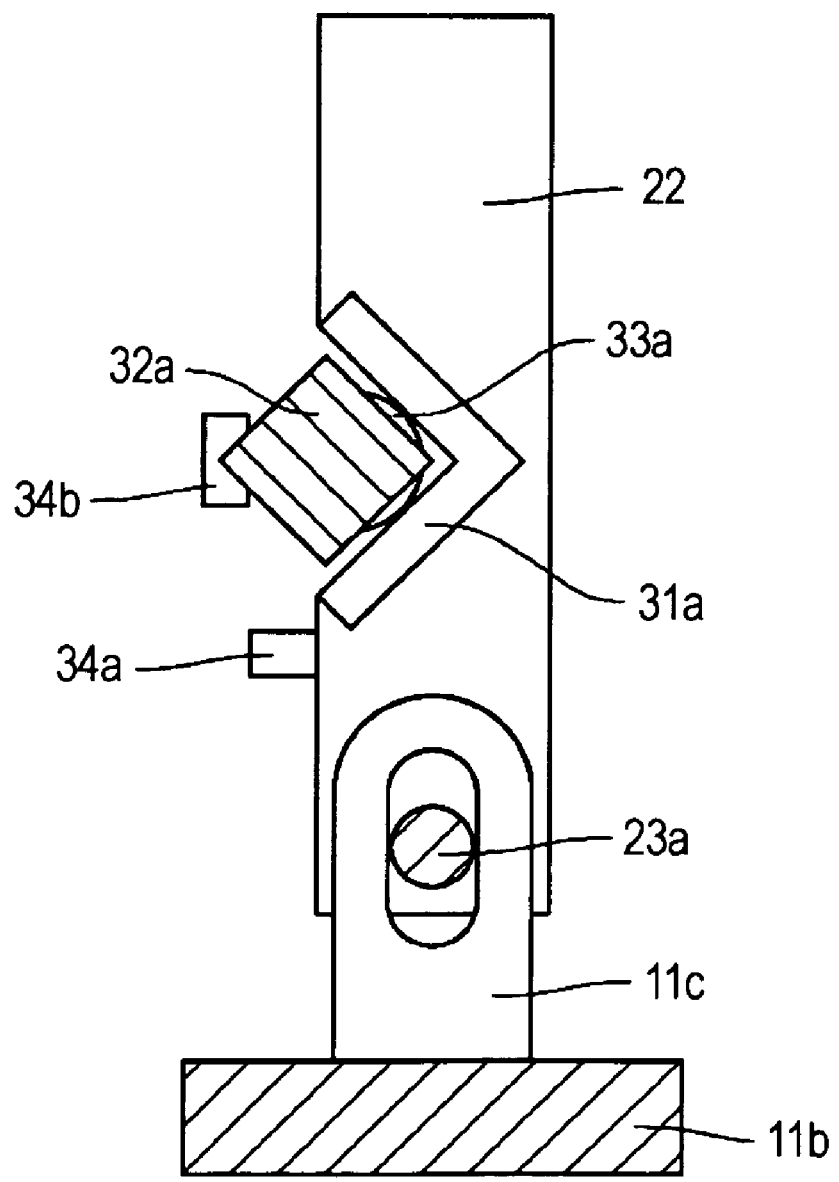
FIG. 4 is a cross-sectional view of the optical element driving unit illustrated in FIG. 3, taken along line IV-IV.

FIG. 4 is a cross-sectional view of the optical element driving unit illustrated in FIG. 3, taken along line IV-IV.

The optical element driving unit 120 illustrated in FIG. 3 is an optical element driving device that serves as a motion blur correction mechanism using a lens shift method in the digital still camera 10 illustrated in FIGS. 1 and 2. To be specific, a lens 21 for motion blur correction, which is an optical element, is moved in two directions perpendicular to the optical axis, whereby degradation of an image due to motion blur can be prevented.

In addition to the motion blur correction mechanism using the lens shift method, the optical element driving unit 120 is applicable to a motion blur correction mechanism using an imager shift method that moves an image pickup device (in the present specification, an image pickup device is also an optical element).

The lens 21 is held by a lens holder 22 (which is an optical element holder) having a rectangular shape. A part of the lens holder 22 adjacent to a corner thereof (the lower right corner in FIG. 3) is movably attached to a fixing member 11c that protrudes from a fixing member 11b, which is disposed in the barrel body, via a guide shaft 23a extending in the X direction.

As illustrated in FIG. 4 (cross-sectional view taken along line IV-IV of FIG. 3), the guide shaft 23a is inserted into a slot in the fixing member 11c. Thus, the lens holder 22 is also movable in the Y direction within the range of the slot.

The optical element driving unit 120, which is an optical element driving device according to an embodiment of the present invention, includes a first magnetic body 31a that extends parallel to the guide shaft 23a and the fixing member 11b. As illustrated in FIG. 4 (cross-sectional view taken along line IV-IV of FIG. 3), the first magnetic body 31a is a bar-shaped member having an L-shaped cross section. The first magnetic body 31a is attached to the lens holder 22 so as to extend in the X direction and so that the opening of the L-shape is oriented outward.

The optical element driving unit 120 further includes a first piezoelectric element 32a that moves the lens holder 22 in the X direction. A first magnet 33a having a cylindrical shape is attached to an end surface of the first piezoelectric element 32a in a direction in which the first piezoelectric element 32a generates a displacement (the X direction). The first magnet 33a is in contact with an inner surface of the first magnetic body 31a by magnetic force.

A first magnetic sensor 34a, which includes a device that converts a change in magnetic force to an electric signal, is disposed so that the first magnetic sensor 34a can detect a change in the magnetic force of the first magnet 33a when viewed from the first magnetic body 31a, the change in the magnetic force being generated due to driving of the first piezoelectric element 32a. The first magnetic sensor 34a and the lens holder 22 are fixed to the same member so that the first magnetic sensor 34a and the lens holder 22 can move together. When the first piezoelectric element 32a vibrates, the first magnetic body 31a moves relative to the first magnet 33a, and the first magnetic sensor 34a detects a change in the distance between the first magnetic body 31a and the first magnet 33a.

The other end surface of the first piezoelectric element 32a in a direction in which the first piezoelectric element 32a generates a displacement (the X direction) is attached to a movement frame 24. A second magnetic body 31b, which is a bar-shaped member having an L-shaped cross section, is disposed on the movement frame 24 so as to extend in the Y direction and so that the opening of the L-shape is oriented outward.

A second piezoelectric element 32b is disposed on the fixing member 11b below the second magnetic body 31b. The second piezoelectric element 32b moves the lens holder 22 in the Y direction via the movement frame 24 and the first magnet 33a. A second magnet 33b having a cylindrical shape is attached to an end surface of the second piezoelectric element 32b in a direction in which the second piezoelectric element 32b generates a displacement (the Y direction). The second magnet 33b is in contact with the inner surface of the second magnetic body 31b by magnetic force. A second magnetic sensor 34b and the fixing member 11b are fixed to the same member.

Therefore, when the first piezoelectric element 32a is driven and the first magnet 33a is vibrated so as to slidingly move the first magnetic body 31a, the lens holder 22 is moved in the X direction (a direction perpendicular to the optical axis of the lens 21) relative to the movement frame 24. When the second piezoelectric element 32b is driven and the second magnet 33b is vibrated so as to slidingly move the second magnetic body 31b, the lens holder 22 is moved via the movement frame 24 in the Y direction (a direction perpendicular to the optical axis of the lens 21 and perpendicular to the direction (the X direction) in which the lens holder 22 is moved by the first magnetic body 31a) relative to the fixing member 11b.

The lens holder 22 is prevented from being rotated around the guide shaft 23a, because the first magnetic body 31a and the first magnet 33a are in contact with each other by magnetic force. The lens holder 22 is prevented from being rotated around the first magnet 33a and the second magnet 33b due to the fixing member 11c. Thus, the lens 21 is movable in only two directions that are perpendicular to the optical axis (X and Y directions).

Example Structure of Optical Element Driving Device

FIG. 5 is a perspective view of a main part of a lens driving mechanism, which is an optical element driving device according to an embodiment of the present invention.

FIG. 5 illustrates the first magnetic body 31a, the first piezoelectric element 32a, the first magnet 33a, and the first magnetic sensor 34a, which are included in the lens driving mechanism. The second magnetic body 31b, the second piezoelectric element 32b, and the second magnet 33b have the same shapes as the first magnetic body 31a, the first piezoelectric element 32a, and the first magnet 33a, respectively.

The first piezoelectric element 32a includes a stack of piezoelectric ceramic plates. The first magnet 33a (for example, a neodymium magnet, a samarium-cobalt magnet, or the like) having a cylindrical shape is bonded to an end surface of the first piezoelectric element 32a in a direction in which the first piezoelectric element 32a generates a displacement (longitudinal direction) by using an epoxy adhesive, an acrylic adhesive, or the like. Thus, when the first piezoelectric element 32a is driven and the piezoelectric ceramic plate extends and contracts in the directions indicated by arrows, the first magnet 33a vibrates in the directions indicated by the arrows.

The first magnetic body 31a for moving the lens holder 22 (see FIG. 3) has an L-shaped cross section, and is made of a material that can be attracted by a magnet (for example, stainless steel (SUS 430) or the like). Thus, the first magnet 33a (for example, a neodymium magnet, a samarium-cobalt magnet, or the like) having a cylindrical shape is in contact (along two lines) with the L-shaped inner surface of the first magnetic body 31a.

A driving voltage having, for example, a triangular waveform is applied to the first piezoelectric element 32a of the optical element driving device according to an embodiment of the present invention. At this time, the driving voltage is applied so that the first piezoelectric element 32a slowly extends in a long time T, and so that the first piezoelectric element 32a contracts in a short time t and generates an acceleration that is larger than the maximum static friction generated by magnetic force between the first magnet 33a and the first magnetic body 31a. Thus, over the long time T, the first magnet 33a and the first magnetic body 31a move together. Over the short time t, sliding occurs between the first magnet 33a and the first magnetic body 31a, so that the first magnetic body 31a is not moved by the movement of the first magnet 33a.

The first magnetic body 31a has an L-shaped cross section, and the inner surface of the first magnetic body 31a is in contact with the peripheral surface of the first magnet 33a having a cylindrical shape, so that the first magnetic body 31a can slide only in the longitudinal directions of the first magnet 33a. Thus, when the first piezoelectric element 32a is driven so as to slowly extend in the long time T and rapidly contract in the short time t, the first magnetic body 31a moves in one of the longitudinal directions of the first magnet 33a. If the first piezoelectric element 32a is driven so as to slowly contract and rapidly extend, the first magnetic body 31a moves in the opposite direction.

Therefore, by making the first piezoelectric element 32a vibrate the first magnet 33a, the first magnetic body 31a is slidingly moved, and the lens holder 22 (see FIG. 3), to which the first magnetic body 31a is attached, is moved in the longitudinal direction of the first magnet 33a (in the X direction of FIG. 3). By moving the lens holder 22 in a direction opposite to the direction in which the lens 21 is shaken by driving the first piezoelectric element 32a, an optical motion blur correction (correction of a motion blur in the X direction that occurs when the lens 21 is moved in the X direction that is perpendicular to the optical axis) is realized.

The amplitude of the vibration of the first piezoelectric element 32a is adjusted by changing the length and the number of the piezoelectric ceramic plates, because the displacement versus applied voltage for each of the piezoelectric ceramic plates is small. Therefore, the amplitude of the vibration can be increased without increasing the thickness of the first piezoelectric element 32a, so that a lens driving mechanism having a small thickness along the optical axis can be produced.

Likewise, by driving the second piezoelectric element 32b, the lens holder 22 can be moved in the longitudinal directions of the second magnetic body 31b (the Y directions in FIG. 3) via the movement frame 24 and the like to which the second magnetic body 31b is attached. By moving the lens holder 22, motion blur correction (correction of a motion blur in the Y direction that occurs when the lens 21 is moved in the Y directions that are perpendicular to the optical axis) is realized.

As illustrated in FIG. 5, the first magnetic body 31a has an L-shaped cross section including a vertex and first and second legs each extending from the vertex. The first and second legs have substantially the same shape and have an opening therebetween. The first magnet 33a is coupled to the first and second legs of the first magnetic body 31a on the opening side. The first magnetic sensor 34a is disposed on the opening side of the first magnetic body 31a. The first magnetic sensor 34a is attached to the barrel body of the lens barrel 20 (see FIG. 1). In order to detect the position of the lens holder 22 (see FIG. 3), which is moved by the first piezoelectric element 32a in the X direction, the first magnetic sensor 34a is disposed so that the first magnetic sensor 34a can detect a change in magnetic force caused by the movement of the first magnet 33a.

The disposition of the second magnetic sensor 34b illustrated in FIG. 3 will be described below.

FIGS. 6A and 6B illustrate the relationship between the position of the first magnetic sensor 34a and the position of the first magnet 33a in the optical element driving device according to the embodiment of the present invention.

As illustrated in FIG. 6A, the first magnet 33a having a cylindrical shape is magnetized in a direction perpendicular to a magnetization line that is a straight line connecting the vertex of the first magnetic body 31a and the center of the cross section of the first magnet 33a (diagonally at an angle of 45° in FIG. 6A). The first magnetic sensor 34a is disposed at a position that is not on the magnetization line in the cross-sectional view of the first magnetic body 31a so that the first magnetic sensor 34a can detect a magnetic force (magnetic flux density) that is normal to the first magnet 33a.

For example, the first magnetic sensor 34a can be disposed at an angle 1 that is in the direction normal to the south pole of the first magnet 33a, an angle 2 that is in the X direction, an angle 3 that is perpendicular to the angle 1, an angle 4 that is in the Y direction, and an angle 5 that is the direction normal to the north pole.

However, in consideration of the direction of magnetization of the first magnet 33a and the cross-sectional shape of the first magnetic body 31a, if the first magnetic sensor 34a is disposed at the angle 3, an output from the first magnetic sensor 34a is not obtained (the magnetic flux density does not change). If the first magnetic sensor 34a is disposed in a range 1 or a range 2, an output from the first magnetic sensor 34a can be sufficiently obtained. If the first magnetic sensor 34a is disposed in a range 3, an output is not obtained. If the first magnetic sensor 34a is disposed in a range 4, an output is not appropriately obtained.

Therefore, it is preferable that the first magnetic sensor 34a be disposed in the range 1 or the range 2. For example, if the first magnetic sensor 34a is disposed at the angle 4 in the range 2, a range indicated by an arrow in FIG. 6B is the range of relative movement between the first magnetic sensor 34a and the first magnet 33a due to the movement of the first magnet 33a. As a result, an output waveform in accordance with the position of the first magnetic sensor 34a relative to the position of the first magnet 33a is obtained.

Thus, the optical element driving device according to an embodiment of the present invention detects a change in magnetic force (magnetic flux density), which is caused by the movement of the first magnet 33a, by using the first magnetic sensor 34a. (The movement of the first magnet 33a relative to the sensor fixing member is detected.) Thus, the position of the lens holder 22 (see FIG. 3) can be accurately detected.

Next, the optimum position of the first magnetic sensor 34a (angular displacement θ from the angle 4 assuming that the counterclockwise direction is positive) will be described.

Figure 7:
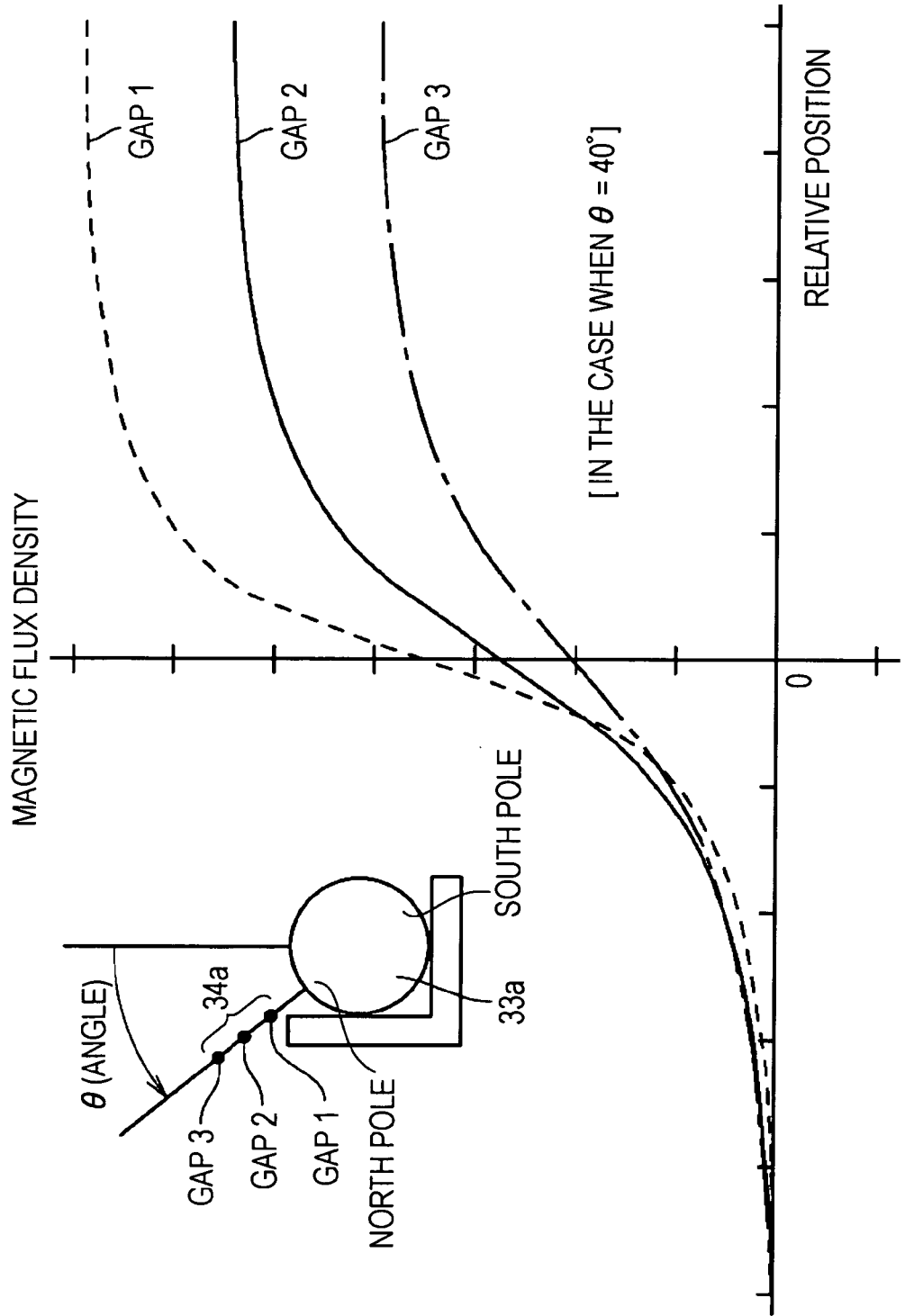
FIG. 7 is a graph illustrating the output waveforms of the first magnetic sensor (θ=40°) illustrated in FIGS. 6A and 6B, each of the waveforms corresponding to the position of the first magnetic sensor relative to the position of the first magnet.

FIG. 7 is a graph illustrating the output waveforms of the first magnetic sensor 34a (θ=40°) illustrated in FIGS. 6A and 6B, each of the waveforms corresponding to the position of the first magnetic sensor relative to the position of the first magnet 33a.

Figure 8:
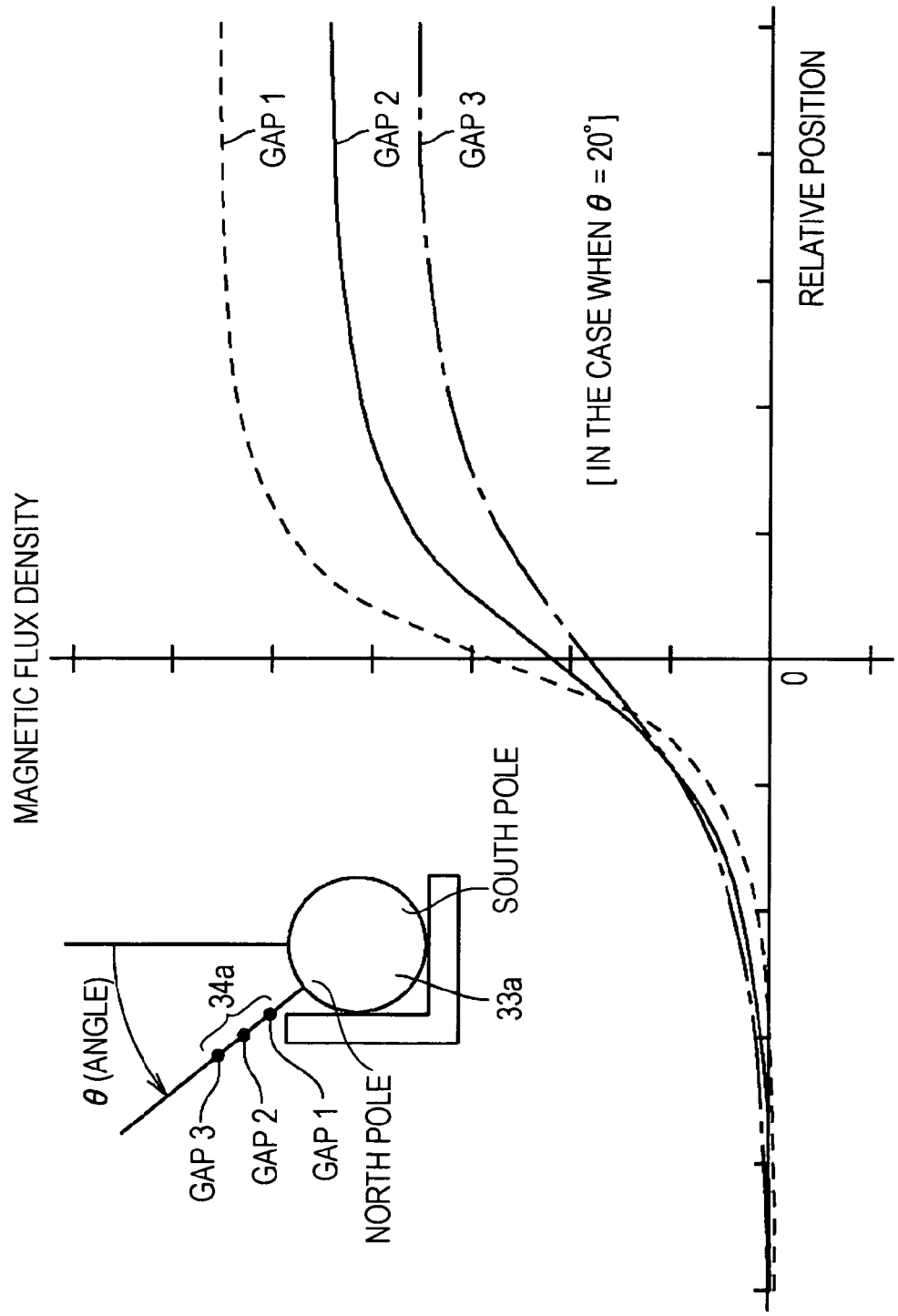
FIG. 8 is a graph illustrating the output waveforms of the first magnetic sensor (θ=20°) illustrated in FIGS. 6A and 6B, each of the waveforms corresponding to the position of the first magnetic sensor relative to the position of the first magnet.

FIG. 8 is a graph illustrating the output waveforms of the first magnetic sensor 34a (θ=20°) illustrated in FIGS. 6A and 6B, each of the waveforms corresponding to the position of the first magnetic sensor relative to the position of the first magnet 33a.

Figure 9:
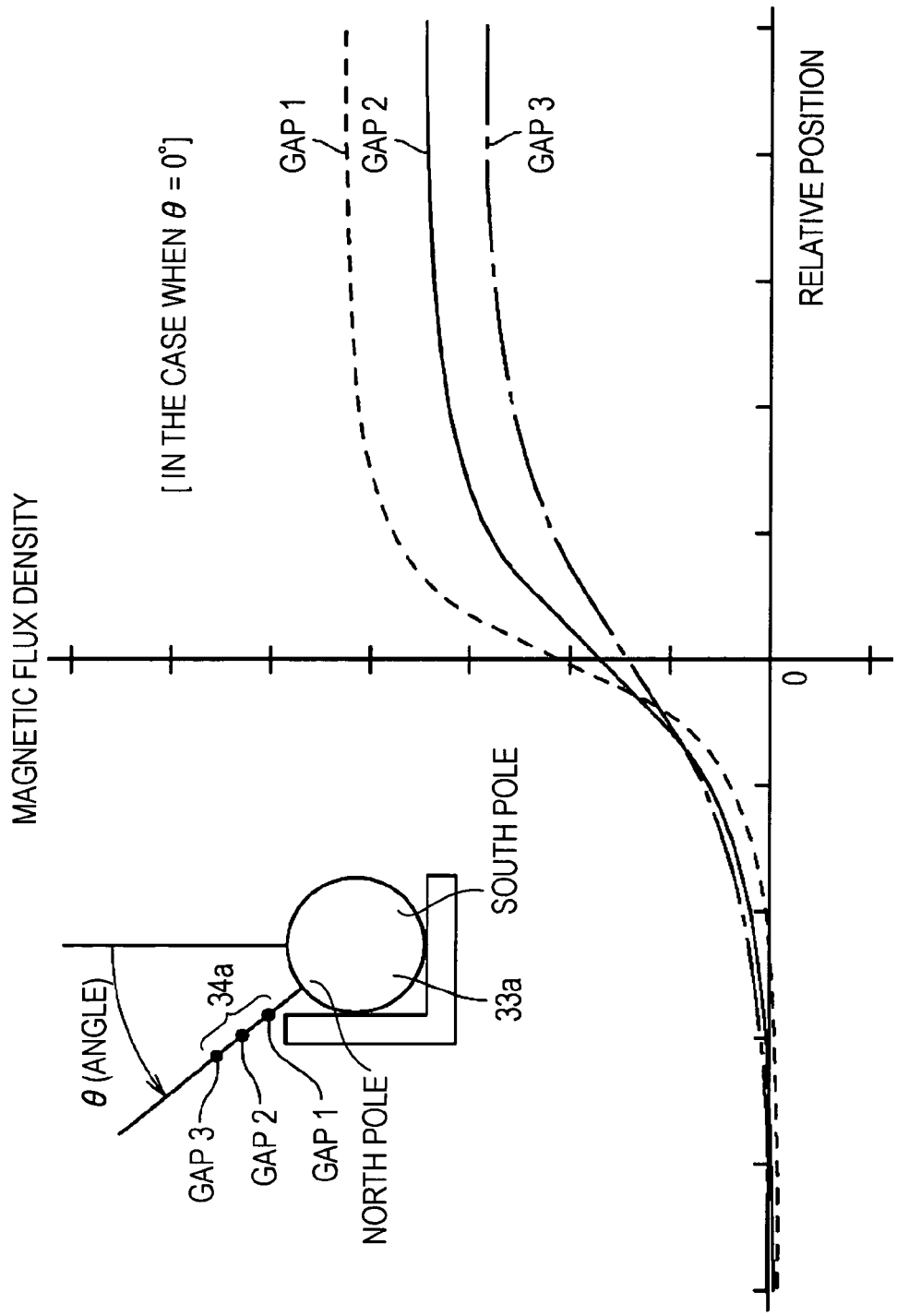
FIG. 9 is a graph illustrating the output waveforms of the first magnetic sensor (θ=0°) illustrated in FIGS. 6A and 6B, each of the waveforms corresponding to the position of the first magnetic sensor relative to the position of the first magnet.

FIG. 9 is a graph illustrating the output waveforms of the first magnetic sensor 34a ($\theta=0°$) illustrated in FIGS. 6A and 6B, each of the waveforms corresponding to the position of the first magnetic sensor relative to the position of the first magnet 33a.

Figure 10:
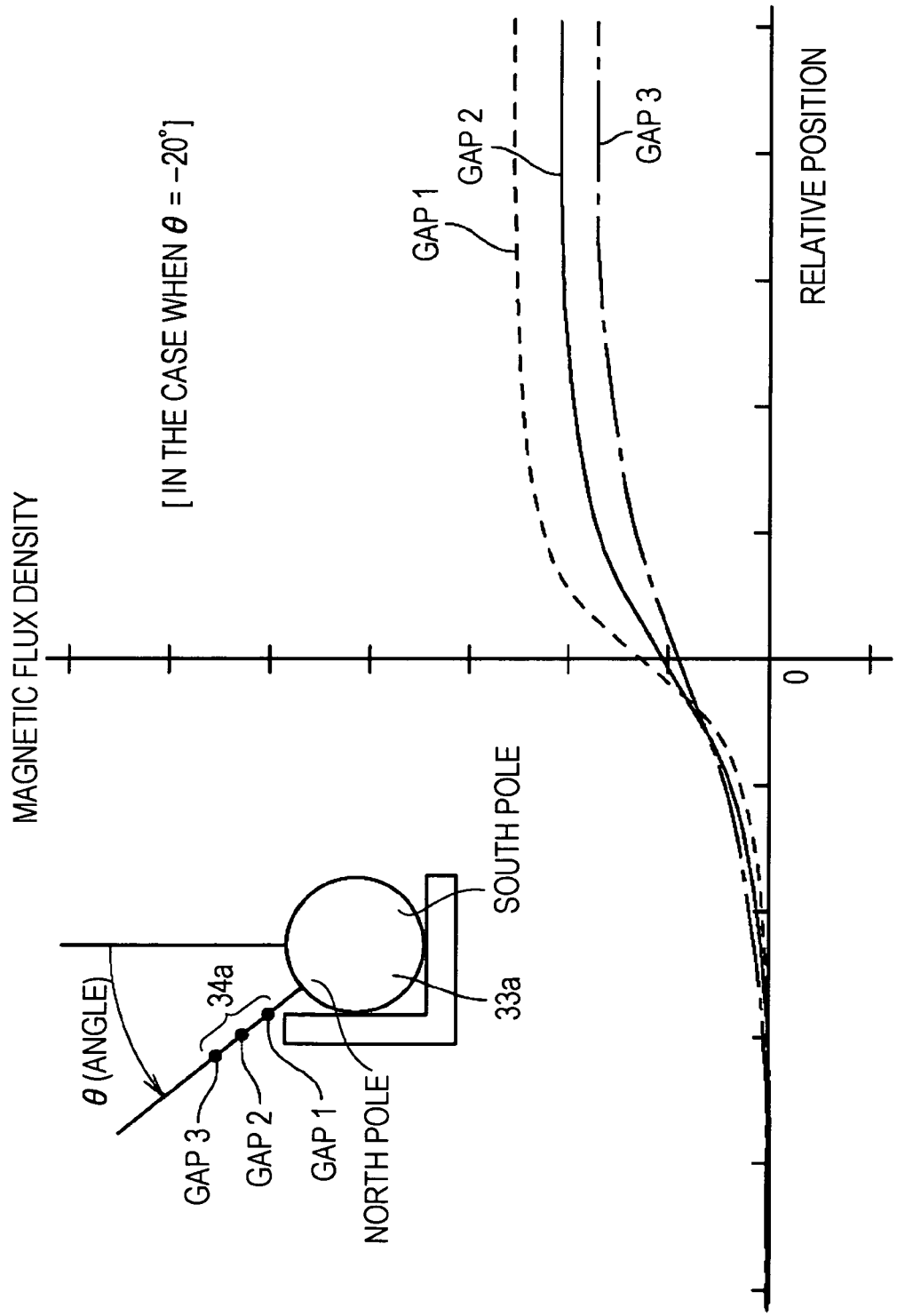
FIG. 10 is a graph illustrating the output waveforms of the first magnetic sensor (θ=−20°) illustrated in FIGS. 6A and 6B, each of the waveforms corresponding to the position of the first magnetic sensor relative to the position of the first magnet.

FIG. 10 is a graph illustrating the output waveforms of the first magnetic sensor 34a ($\theta=-20°$) illustrated in FIGS. 6A and 6B, each of the waveforms corresponding to the position of the first magnetic sensor relative to the position the first magnet 33a.

A gap 1 (0.1 mm), a gap 2 (0.2 mm), and a gap 3 (0.3 mm) are the distances between the first magnetic sensor 34a and a surface of the first magnet 33a.

The first magnetic sensor 34a illustrated in FIG. 7 is disposed at $\theta=40°$. In this case, the output waveforms (changes in the magnetic flux density) of the first magnetic sensor 34a are represented by the curves in FIG. 7. When the distance from the first magnet 33a is the gap 1, which is the smallest, the change in magnetic flux density is the largest. As the distance increases to the gap 2 and the gap 3, the change in magnetic flux density decreases.

In order to accurately detect the position of the lens holder 22 (see FIG. 3), it is necessary to use a range in which the magnetic flux density detected by the first magnetic sensor 34a uniformly (linearly) increases or decreases. In other words, the position of the first magnet 33a can be accurately detected by using, as positional information, only a region in which the output waveform of the first magnetic sensor 34a is substantially linear. For the gap 3, the length of the region in which the output waveform is substantially linear is the largest. As the distance decreases toward the gap 2 and the gap 1, the length of such a region decreases.

The first magnetic sensor 34a illustrated in FIG. 8 is disposed at $\theta=20°$, the first magnetic sensor 34a illustrated in FIG. 9 is disposed at $\theta=0°$, and the first magnetic sensor 34a illustrated in FIG. 10 is disposed at $\theta=-20°$. In FIGS. 8 to 10, the output waveforms (changes in the magnetic flux density) of the first magnetic sensor 34a have the same trend as that of FIG. 7. However, the magnitude of the change in magnetic flux density gradually becomes smaller.

Figure 11:
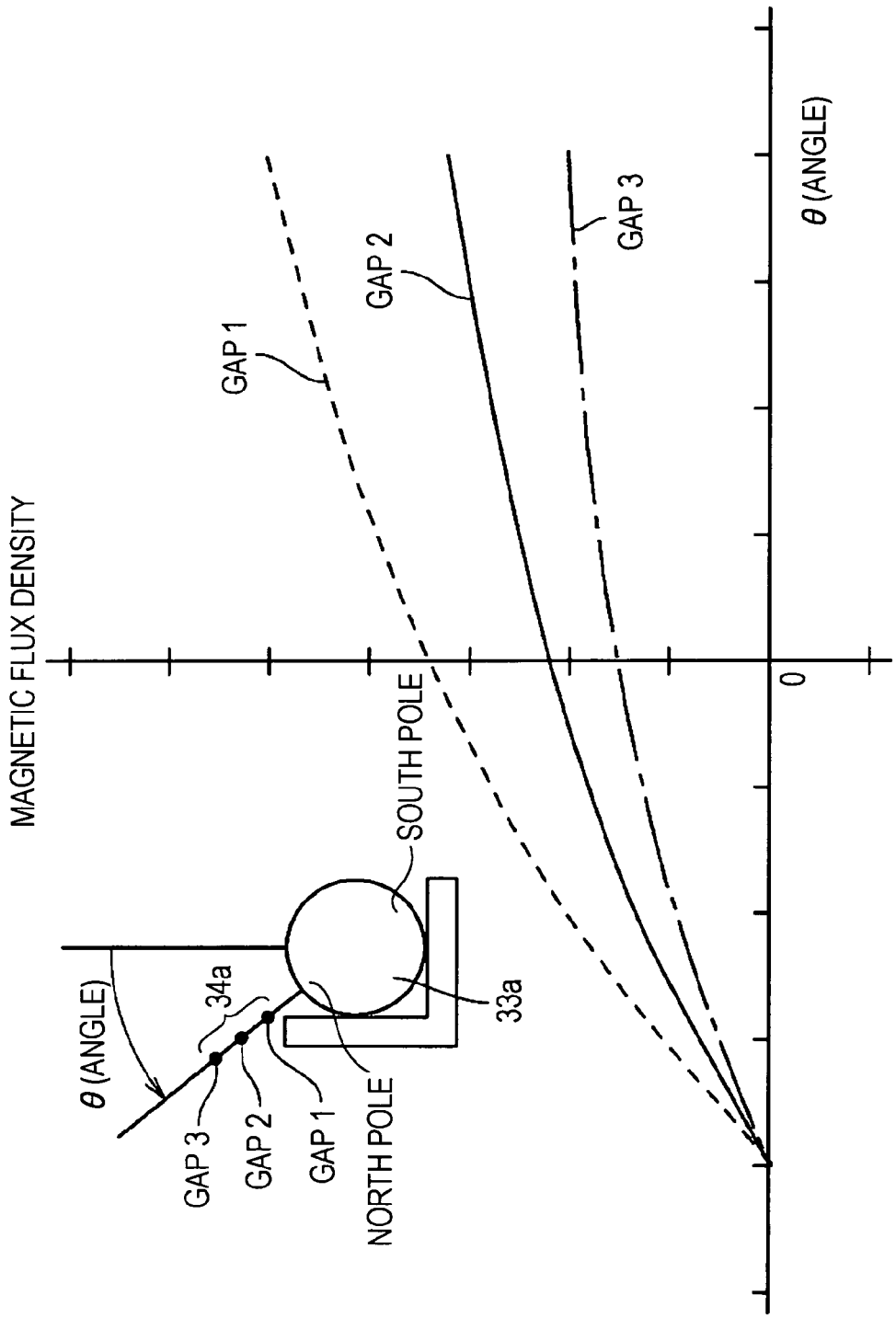
FIG. 11 is a graph illustrating the output amplitude (the difference between the outputs at the ends of the region) in a region along the horizontal axis that is taken from FIGS. 7 to 9.

FIG. 11 is a graph illustrating the output amplitude (the difference between the outputs at the ends of a region) in a region along the horizontal axis that is taken from FIGS. 7 to 9.

For the graph of FIG. 11, the relative positions of the first magnet 33a and the first magnetic sensor 34a are in the range from −0.2 mm to +0.2 mm.

As illustrated in FIG. 11, as the angle $\theta$ of disposition of the first magnetic sensor 34a increases from negative to positive, the change in magnetic flux density increases. This trend is the same when the distance between the first magnet 33a and the first magnetic sensor 34a is the gap 1, the gap 2, and the gap 3.

Figure 12:
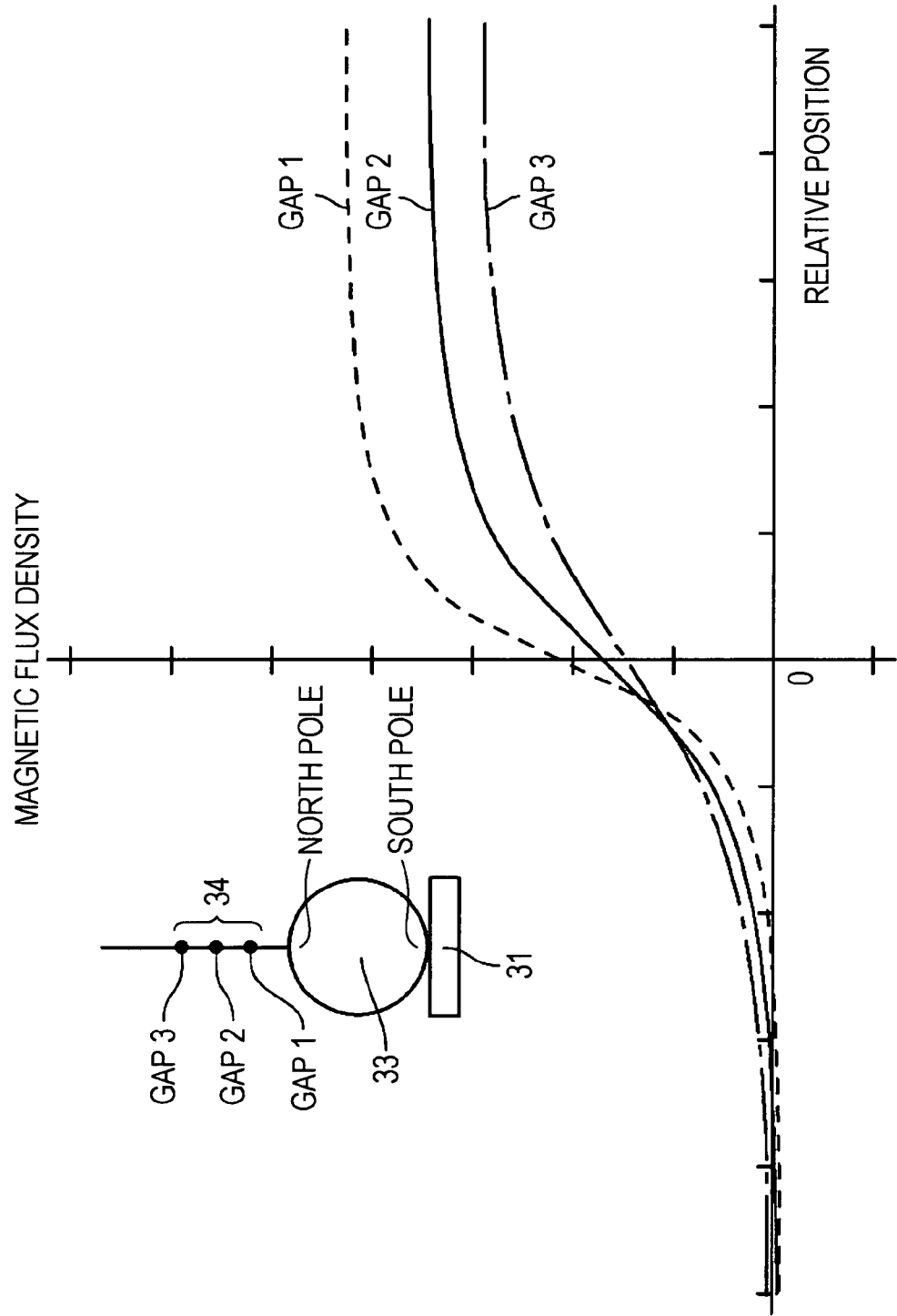
FIG. 12 is a graph illustrating the output waveforms of the first magnetic sensor illustrated in FIGS. 6A and 6B when the direction of magnetization of the first magnet and the shape of the first magnetic body are changed.

FIG. 12 is a graph illustrating the output waveforms of the first magnetic sensor illustrated in FIGS. 6A and 6B when the direction of magnetization of the first magnet and the shape of the first magnetic body are changed.

When the first magnetic body is L-shaped, the optimum direction of magnetization of the first magnet is at the angle of 45° in terms of driving. When a first magnetic body 31, which is flat, is used, the direction of magnetization illustrated in FIG. 12 is the optimum. In this case, as illustrated in FIG. 12, even when the direction of magnetization of a first magnet 33 is changed and the first magnetic body 31 is flat instead of being L-shaped, the output of a first magnetic sensor 34 has the same trend as that of the case illustrated in FIGS. 6A and 6B. (An output waveform that uniformly increases or decreases is obtained.) The change in magnetic flux density is the largest when the distance between the first magnetic sensor 34 and the first magnet 33 is the gap 1, which is the smallest, and the magnetic flux density decreases as the distance between the first magnetic sensor 34 and the first magnet 33 increases to the gap 2 and the gap 3. The length of the region in which the output waveform is substantially linear is the largest for the gap 3, and the length of the region decreases as the distance between the first magnetic sensor 34 and the first magnet 33 decreases to the gap 2 and the gap 1.

As described above, the graphs of FIGS. 7 to 12 illustrate the output waveforms corresponding to the relative positions of the first magnetic sensor and the first magnet for the angle $\theta$ and the gaps 1, 2, and 3. It is preferable that, with respect to the direction of magnetization of the first magnet, the first magnetic sensor be disposed at a position at which (the angle $\theta$, the gaps 1, 2, and 3 be determined such that) the change in magnetic flux density is large and the length of the region in which the output waveform is substantially linear is large.

In practice, the position of the first magnetic sensor is appropriately determined with consideration of the shape of the body 11 (see FIGS. 1 and 2), limitation on the structure of the lens barrel 20 (see FIG. 3) and the like, the change in magnetic flux density illustrated in FIGS. 7 to 12, and the length of the region in which the output waveform is substantially linear.

Figure 13A:
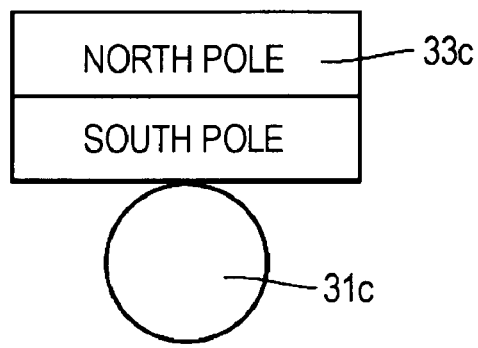
FIG. 13A is a front view and FIG. 13B is a perspective view of a main part of a lens driving mechanism, which is an optical element driving device according to another embodiment of the present invention.
Figure 13B:
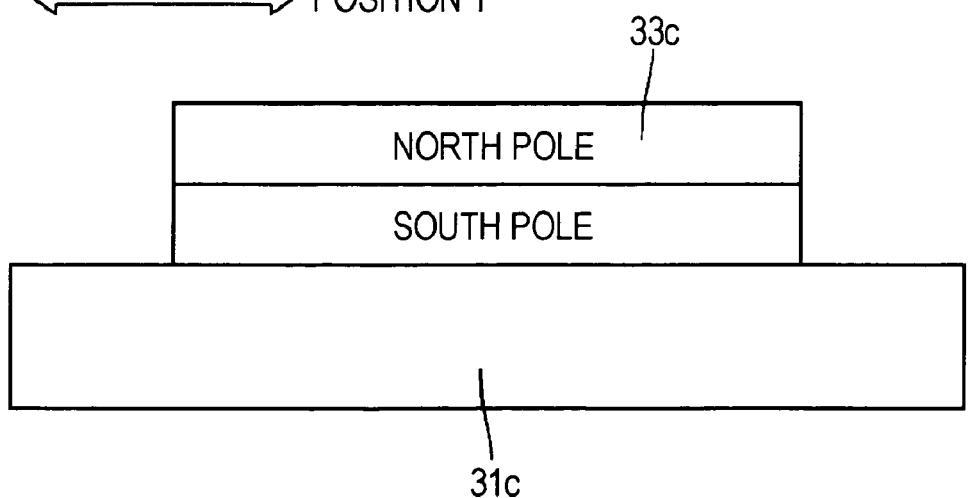

FIG. 13A is a front view and FIG. 13B is a side view of a main part of a lens driving mechanism, which is an optical element driving device according to another embodiment of the present invention.

Figure 14A:
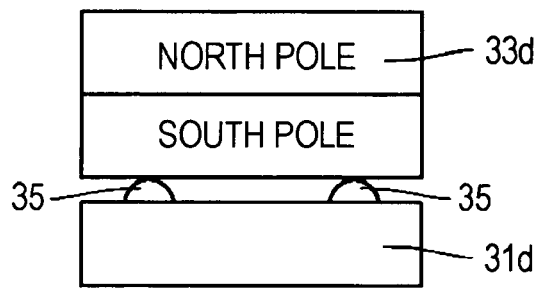
FIG. 14A is a front view and FIG. 14B is a perspective view of a main part of a lens driving mechanism, which is an optical element driving device according to still another embodiment of the present invention.
Figure 14B:
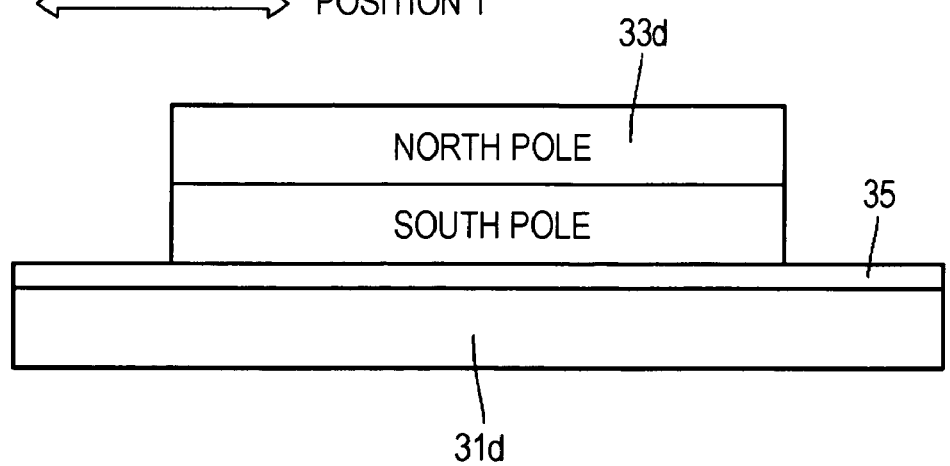

FIG. 14A is a front view and FIG. 14B is a side view of a main part of a lens driving mechanism, which is an optical element driving device according to still another embodiment of the present invention.

As illustrated in FIGS. 13A to 14B, the first magnet may not be the first magnet 33a having a cylindrical shape illustrated in FIG. 5, and may be a first magnet 33c or 33d having a prismatic shape.

The lens driving mechanism illustrated FIGS. 13A and 13B includes a combination of the first magnet 33c having a prismatic shape and a first magnetic body 31c having a cylindrical shape. The first magnet 33c is in contact (along one line) with the upper surface of the first magnetic body 31c by magnetic force. The first magnetic body 31c is slidably magnetically attracted to the first magnet 33c with friction, which is appropriate as a lens driving mechanism, therebetween.

A first magnetic sensor 34c is disposed at a position 1, a position 2, a position 3, or the like above the first magnet 33c. The range of relative movement between the first magnetic sensor 34c and the first magnet 33c is indicated by an arrow in FIG. 13B. Thus, the first magnetic sensor 34c can detect the change in magnetic force caused by the movement of the first magnet 33c.

The lens driving mechanism illustrated FIGS. 14A and 14B includes a combination of the first magnet 33d having a prismatic shape and a first magnetic body 31d having a prismatic shape. To be specific, two rails 35 are disposed on the upper surface of the first magnetic body 31d, and the first magnet 33d is in contact (along two lines) with the upper surface of the first magnetic body 31d with the rails 35 therebetween by magnetic force. Thus, the first magnetic body 31d is slidably attracted to the first magnet 33d with friction, which is appropriate as a lens driving mechanism, therebetween.

A first magnetic sensor 34d is disposed at a position 1, a position 2, a position 3, or the like above the first magnet 33d. The range of relative movement between the first magnetic sensor 34d and the first magnet 33d is indicated by an arrow in FIG. 14B. Thus, the first magnetic sensor 34d can detect the change in magnetic force caused by the movement of the first magnet 33d.

The shape of the first magnet according to an embodiment of the present invention may not be cylindrical as illustrated in FIG. 5, and may be prism-shaped as illustrated in FIGS. 13A to 14B, or may have a different shape. The shape of the first magnetic body according to an embodiment of the present invention may not be L-shaped as illustrated in FIG. 5, and may be cylindrical as illustrated in FIGS. 13A and 13B, prism-shaped as illustrated in FIGS. 14A and 14B, or may have a different shape. By disposing the first magnetic sensor at an appropriate position, the first magnetic sensor can detect the position of the first magnet relative to the first magnetic sensor.

The shape of the first magnetic body may not be L-shaped as illustrated in FIG. 5, and may be V-shaped or U-shaped. By disposing the first magnet and the second magnetic body in line contact with each other, the influence of the manufacturing error on the movement characteristics can be reduced. The second magnet and the second magnetic body may have various shapes as with the first magnet and the first magnetic body.

The second magnetic sensor 34b is disposed so that the second magnetic sensor 34b can detect the change in magnetic force caused by the movement of the first magnet 33a. To be specific, referring to FIG. 3, when the second piezoelectric element 32b vibrates the second magnet 33b so as to slidingly move the second magnetic body 31b, the lens holder 22 is moved in the Y direction via the movement frame 24, to which the second magnetic body 31b is attached, and via the first magnet 33a, and the like. The second magnetic sensor 34b detects the position of the lens holder 22, which is moved by the second piezoelectric element 32b, by detecting the change in magnetic force caused by the movement of the first magnet 33a.

Figure 15A:
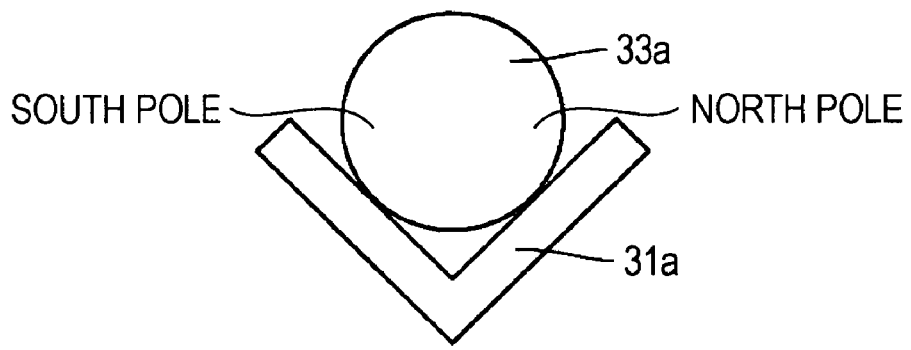
FIGS. 15A and 15B illustrate the relationship between the position of a second magnetic sensor and the position of the first magnet in the optical element driving device according to the embodiment of the present invention.
Figure 15B:
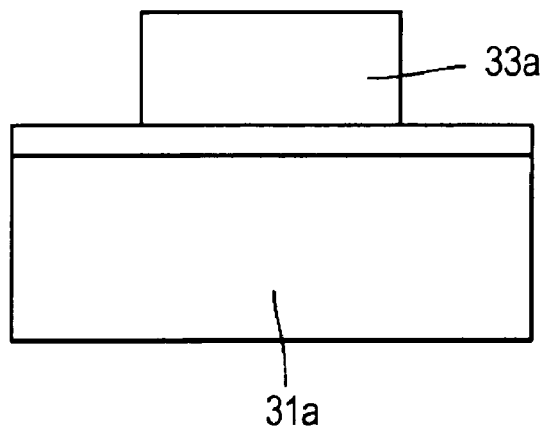

FIGS. 15A and 15B illustrate the relationship between the position of the second magnetic sensor 34b and the position of the first magnet 33a in an optical element driving device according to an embodiment of the present invention.

As illustrated in FIG. 15A, the first magnet 33a, which has a cylindrical shape, is magnetized in the left-right direction. A peripheral surface of the first magnet 33a is in contact with an L-shaped inner surface of the first magnetic body 31a. Thus, the first magnet 33a can move only in the longitudinal direction of the first magnetic body 31a as illustrated in FIG. 15B.

The distance between the second magnetic sensor 34b and the first magnet 33a is, for example, a gap 1 (0.1 mm), a gap 2 (0.2 mm), or a gap 3 (0.3 mm). With respect to the direction in which the second piezoelectric element 32b (see FIG. 3) generates a displacement, the range of relative movement between the second magnetic sensor 34b and the first magnet 33a is indicated by arrows in FIG. 15A. Thus, the output waveforms in accordance with the relative positions of the second magnetic sensor 34b and the first magnet 33a can be obtained by the second magnetic sensor 34b.

Figure 16:
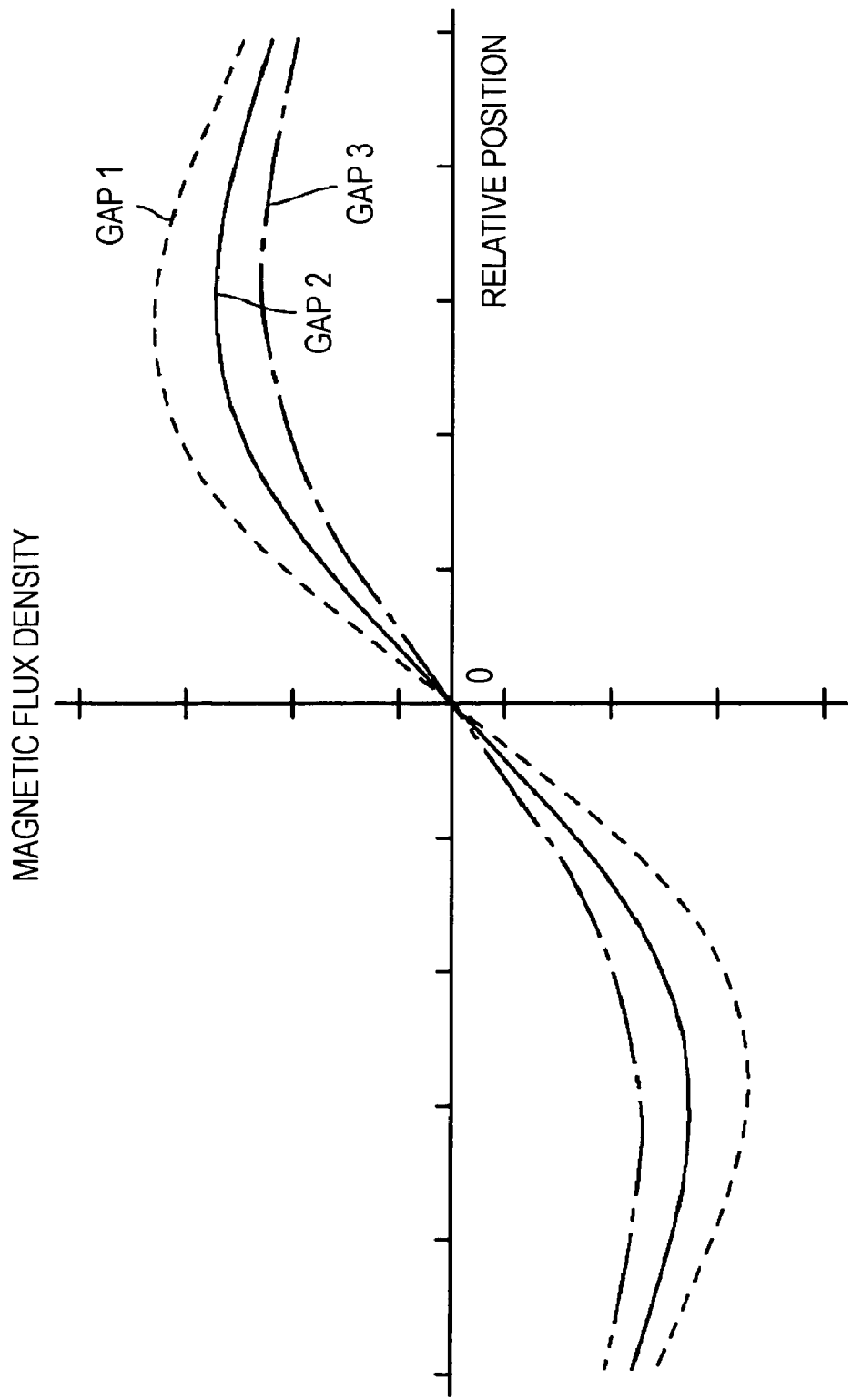
FIG. 16 is a graph illustrating the output waveforms of the second magnetic sensor illustrated in FIGS. 15A and 15B, each of the waveforms corresponding to the position of the second magnetic sensor relative to the position of the first magnet.

FIG. 16 is a graph illustrating the output waveforms of the second magnetic sensor 34b illustrated in FIGS. 15A and 15B, each of the waveforms corresponding to the position of the second magnetic sensor 34b relative to the first magnet 33a.

FIG. 16 illustrates curves that represent the output waveforms of the second magnetic sensor 34b (changes in magnetic flux density) when the second magnetic sensor 34b is disposed as illustrated in FIGS. 15A and 15B. When the distance between the second magnetic sensor 34b and the first magnet 33a is the gap 1, which is the smallest, the change in magnetic flux density is the largest, and the change in magnetic flux density decreases as the distance increases to the gap 2 and gap 3.

In order to accurately detect the position of the first magnet 33a, it is necessary to use a range in which the magnetic flux density detected by the second magnetic sensor 34b uniformly (linearly) increases or decreases. In other words, the position of the first magnet 33a can be accurately detected by using a region in which the output waveform of the second magnetic sensor 34b is substantially linear.

The graph of FIG. 16 illustrates the output waveform corresponding to the relative positions of the second magnetic sensor 34b and the first magnet 33a for the gaps 1, 2, and 3. It is preferable that the second magnetic sensor 34b be disposed, relative to the first magnet 33a, in a region in which (the gaps 1, 2, and 3 be determined such that) the change in magnetic flux density is large and the output waveform is substantially linear. In practice, the position of the second magnetic sensor 34b is appropriately determined with consideration of the shape of the body 11 (see FIGS. 1 and 2), limitation on the structure of the lens barrel 20 (see FIG. 3) and the like, the change in magnetic flux density illustrated in FIG. 16, and the length of the region in which the output waveform is substantially linear.

In the lens barrel 20 according to the first embodiment illustrated in FIG. 3, the first magnetic sensor 34a is disposed so that the first magnetic sensor 34a can detect a change in magnetic force caused by the movement of the first magnet 33a due to the displacement of the first piezoelectric element 32a. The second magnetic sensor 34b is disposed so that the second magnetic sensor 34b can detect a change in magnetic force caused by the movement of the first magnet 33a due to the displacement of the second piezoelectric element 32b. Thus, the first magnetic sensor 34a and the second magnetic sensor 34b can be disposed close to the first magnet 33a, whereby a space for a circuit that transmits an electric signal, which is generated by converting the change in magnetic force, can be reduced.

The second magnetic sensor 34b may be attached to the fixing member 11b so that the second magnetic sensor 34b detects a change in magnetic force of the first magnet 33a that moves together with the lens holder 22 in the Y direction. In contrast, it is necessary that the first magnetic sensor 34a move together with the lens holder 22. Thus, wiring for the first magnetic sensor 34a is complex because it is necessary to extend a power cables and the like to the first magnetic sensor 34a in the lens holder 22. On the other hand, wiring for the second magnetic sensor 34b is not complex.

When the first magnet 33a moves in the Y direction, the magnetic force detected by the second magnetic sensor 34b changes, but the magnetic force detected by the first magnetic sensor 34a does not change. Thus, the first magnetic sensor 34a and the second magnetic sensor 34b can independently detect the vibration of the first magnet 33a in the X direction and the movement of the first magnet 33a in the Y direction.

2. Second Embodiment

Example Structure of Optical Element Driving Unit of Optical Element Barrel

Figure 17:
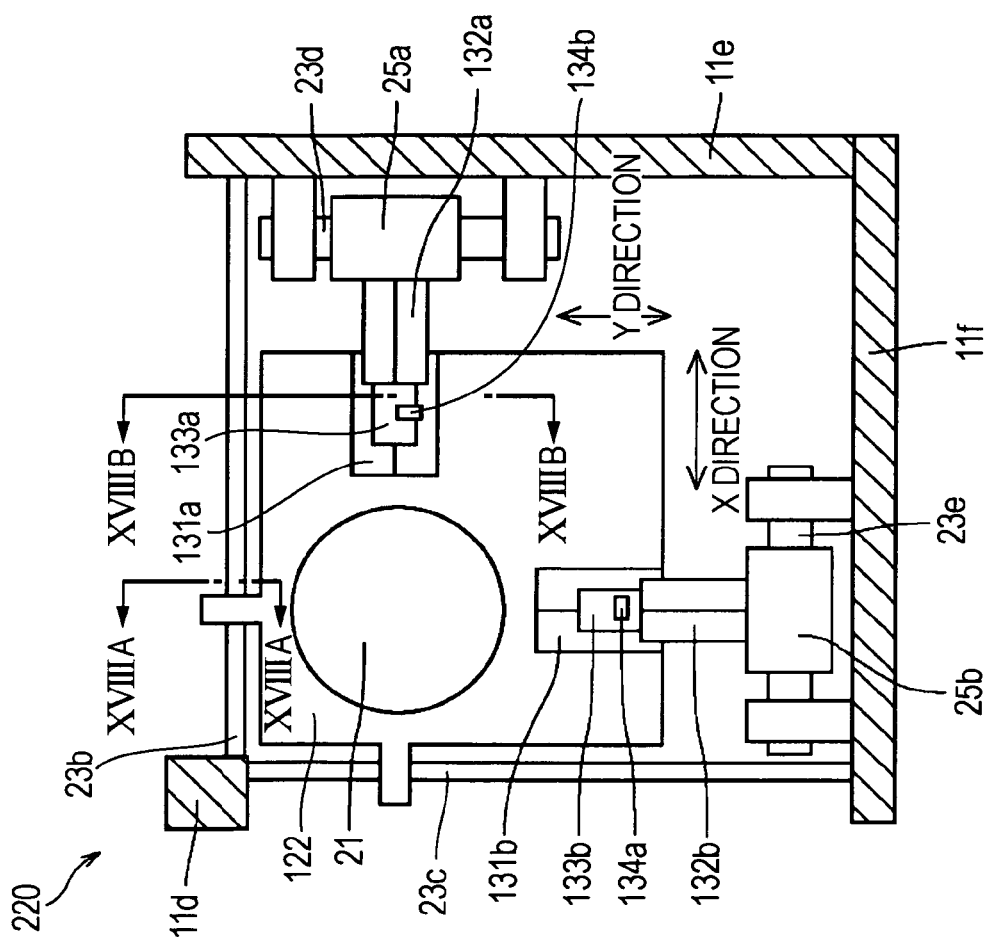
FIG. 17 is a front view of an optical element driving unit of a lens barrel, which is an optical element barrel according to an embodiment (second embodiment) of the present invention.

FIG. 17 is a front view of an optical element driving unit 220 of a lens barrel, which is an optical element barrel according to an embodiment (second embodiment) of the present invention.

FIGS. 18A and 18B are partial cross-sectional views of the optical element driving unit 220 illustrated in FIG. 17, respectively taken along lines XVIIIA-XVIIIA and XVIIIB-XVIIIB.

The optical element driving unit 220 illustrated in FIG. 17 is an optical element driving device that serves as a motion blur correction mechanism using a lens shift method in the digital still camera 10 illustrated in FIGS. 1 and 2. To be specific, the lens 21 for motion blur correction is moved in two directions perpendicular to the optical axis (in the X and Y directions) so as to prevent degradation of a taken image due to shaking.

In FIGS. 17 to 18B, members that are the same as those of the first embodiment are denoted by the same numerals. The optical element driving unit 220 can be used not only for a motion blur correction mechanism using a lens shift method but also for a motion blur mechanism using an imager shift method that moves the image pickup device.

The lens 21 is held by a lens holder 122 (corresponding to an optical element holder) having a rectangular shape. The lens holder 122 can move in the X direction along a guide shaft 23b that is disposed between a fixing member 11d of the barrel body and a fixing member 11e. To be specific, as illustrated in FIG. 18A (cross-sectional view taken along line XVIIIA-XVIIIA of FIG. 17), a recess 122a is formed in the upper part of the lens holder 122, and the guide shaft 23b is inserted into the recess 122a.

The optical element driving unit 220, which is an optical element driving device according to an embodiment of the present invention, includes a first magnetic body 131a that is attached to the lens holder 122 and extends parallel to the guide shaft 23b. As illustrated in FIG. 18B (cross-sectional view taken along line XVIIIB-XVIIIB of FIG. 17), the first magnetic body 131a is a bar-shaped member having an L-shaped cross section, and the opening of the L-shape faces a direction parallel to the optical axis. A first piezoelectric element 132a is attached to the fixing member 11e (see FIG. 17) via a guide shaft 23d and a supporting member 25a. A first magnet 133a, which has a cylindrical shape, is attached to the first piezoelectric element 132a. The first magnet 133a is vibrated in the X direction by the first piezoelectric element 132a. The first magnet 133a is in contact with the L-shaped inner surface of the first magnetic body 131a by magnetic force. The first magnet 133a can slide only in the longitudinal direction of the first magnetic body 131a (X direction).

Therefore, the lens holder 122 can move in the X direction along a surface of the first magnet 133a. The guide shaft 23b prevents the lens holder 122 from being rotated around the first magnet 133a. The first magnetic body 131a and the first magnet 133a are in contact with each other by magnetic force, whereby the lens holder 122 is prevented from being rotated around the guide shaft 23b. Thus, the first magnetic body 131a and the first magnet 133a are in intimate contact with each other, so that the lens 21 is not moved in an unnecessary direction, whereby a good optical performance can be obtained.

Likewise, in the optical element driving unit 220 illustrated in FIG. 17, the lens holder 122 can move in the Y direction along a guide shaft 23c disposed between the fixing member 11d and a fixing member 11f. The lens holder 122 includes a second magnetic body 131b extending parallel to the guide shaft 23c and having an L-shaped cross section, and the opening of the L-shape of the second magnetic body 131b faces a direction parallel to the optical axis. A second piezoelectric element 132b is attached to the fixing member 11f via a guide shaft 23e and a supporting member 25b. A second magnet 133b, which has a cylindrical shape, is attached to the second piezoelectric element 132b. The second magnet 133b is vibrated in the Y direction by the second piezoelectric element 132b. The second magnet 133b is in contact with the L-shaped inner surface of the second magnetic body 131b by magnetic force. The second magnet 133b can slide only in the longitudinal direction of the second magnetic body 131b (Y direction).

Therefore, the lens holder 122 can move in the Y direction along a surface of the second magnet 133b. The guide shaft 23c prevents the lens holder 122 from being rotated around the second magnet 133b. The second magnetic body 131b and the second magnet 133b are in contact with each other by magnetic force, whereby the lens holder 122 is prevented from being rotated around the guide shaft 23c.

With the structure described above, the optical element driving device according to an embodiment of the present invention can move the lens 21 in the X direction by driving the first piezoelectric element 132a. To be specific, the optical element driving device can move the lens holder 122 in the X direction by slidingly moving the first magnetic body 131a by vibrating the first magnet 133a with the first piezoelectric element 132a. As the lens holder 122 moves in the X direction, the second magnet 133b moves in the X direction along the guide shaft 23e.

The guide shaft 23c is inserted into the recess 122a in the lens holder 122, as with the guide shaft 23b illustrated in FIG. 18A (cross-sectional view taken along line XVIIIA-XVIIIA of FIG. 17). Thus, the guide shaft 23c does not hinder the movement of the lens holder 122 in the X direction.

By driving the second piezoelectric element 132b, the lens 21 can be moved in the Y direction. To be specific, the lens holder 122 can be moved in the Y direction by slidingly moving the second magnetic body 131b by vibrating second magnet 133b with the second piezoelectric element 132b. As the lens holder 122 moves in the Y direction, the first magnet 133a moves in the Y direction along the guide shaft 23d.

Thus, the lens holder 122 is moved in the X direction and in the Y direction by the first piezoelectric element 132a and the second piezoelectric element 132b. Therefore, the lens 21 can be freely moved in a plane that is perpendicular to the optical axis, whereby shaking of the digital still camera 10 (see FIGS. 1 and 2) can be optically corrected. By performing closed loop control for driving the first piezoelectric element 132a and the second piezoelectric element 132b in accordance with the position of the lens 21, a good driving performance can be obtained.

The weights of the lens 21 and the lens holder 122 are supported by friction that is generated by the magnetic force between the first magnetic body 131a and the first magnet 133a and by friction that is generated by the magnetic force between the second magnetic body 131b and the second magnet 133b. Thus, in contrast to existing optical element driving devices that use an electromagnetic actuator, it is not necessary to supply electric power, for holding the lens and the like at predetermined positions against the weights thereof, to the optical element driving device according to an embodiment of the present invention, which uses the first piezoelectric element 132a (the second piezoelectric element 132b), the first magnetic body 131a (the second magnetic body 131b), and the first magnet 133a (the second magnet 133b). As a result, low power consumption can be realized.

A first magnetic sensor 134a is disposed so as to detect the position of the lens holder 122 in the X direction, the lens holder 122 being moved by the first piezoelectric element 132a. The first magnetic sensor 134a is disposed on the opening side of the second magnetic body 131b having an L-shape so that the first magnetic sensor 134a can detect a change in magnetic force caused by the movement of the second magnet 133b due to the movement of the lens holder 122. To be specific, the first magnetic sensor 134a and the second magnet 133b move relative to each other as indicated by arrows in FIG. 15A. Thus, in accordance with the relative position of the second magnet 133b, the first magnetic sensor 134a outputs an output waveform in a region in which the output waveform is substantially linear as illustrated in FIG. 16. By detecting the position of the second magnet 133b using the output of the first magnetic sensor 134a, the accurate position of the lens holder 122 in the X direction is detected.

A second magnetic sensor 134b is disposed so as to detect the position of the lens holder 122 in the Y direction, the lens holder 122 being moved by the second piezoelectric element 132b. The second magnetic sensor 134b is disposed on the opening side of the first magnetic body 131a having an L-shape so that the second magnetic sensor 134b can detect a change in magnetic force caused by the movement of the first magnet 133a due to the movement of the lens holder 122. Thus, by detecting the position of the first magnet 133a using the output of the second magnetic sensor 134b, the accurate position of the lens holder 122 in the Y direction is detected.

Therefore, an additional magnet for detecting the position of the lens holder 122 is not necessary, whereby a small size and a low cost can be realized.

The optical element driving device (optical element driving unit 120, the optical element driving unit 220) according to the embodiment of the present invention may freely move, instead of the lens, an image pickup device (such as a CCD image sensor, a CMOS image sensor, and the like) in a plane perpendicular to the optical axis by using the first piezoelectric element, the second piezoelectric element, the first magnetic body, the second magnetic body, the first magnet, and the second magnet. In this case, the optical element driving device functions as a motion blur correction mechanism using an imager shift method. To be specific, the motion blur correction mechanism using an imager shift method includes the optical element holder that holds an image pickup device, the first and second magnets attached to the optical element holder, the first and second magnetic body, the first and second piezoelectric elements that move the optical element holder by slidingly moving the first magnet (second magnet) by vibrating the first magnetic body (second magnetic body), and the first and second magnetic sensors that detect the position of the first magnet (second magnet) that is moved by driving of the first piezoelectric element (second piezoelectric element). The first piezoelectric element (second piezoelectric element) is driven in a state in which the first magnet (second magnet) is coupled to the first magnetic body (second magnetic body). Thus, a motion blur correction mechanism that moves the image pickup device is realized while accurately detecting the position of the image pickup device with the first and second magnetic sensors.

The present invention is not limited to the embodiments described above, and can be modified in various ways. For example, in the embodiments, the image pickup apparatus is the digital still camera 10. However, the present invention is not limited thereto, and is widely applicable to image pickup apparatuses such as a film camera, a digital video camera, a camera-equipped mobile phone, and the like.

The present application contains subject matter related to that disclosed in Japanese Priority Patent Application JP 2009-248339 filed in the Japan Patent Office on Oct. 29, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical element driving device comprising:
an optical element holder that holds an optical element;
a first magnet for moving the optical element holder;
a second magnet for moving the optical element holder in a direction that is perpendicular to a direction in which the first magnet moves the optical element holder;
a first magnetic body and a second magnetic body each having a cross section including a vertex and first and second legs extending from the vertex, the first and second legs having substantially an identical shape and forming an opening therebetween;
a first piezoelectric element that moves the optical element holder by slidingly moving the first magnetic body by vibrating the first magnet;
a second piezoelectric element that moves the optical element holder by slidingly moving the second magnetic body by vibrating the second magnet;
a first magnetic sensor that detects a position of the optical element holder that is moved by driving the first piezoelectric element; and
a second magnetic sensor that detects a position of the optical element holder that is moved by driving the second piezoelectric element,
wherein the first piezoelectric element is driven in a state in which the first magnet is coupled to the first and second legs of the first magnetic body from the opening side, and the second piezoelectric element is driven in a state in which the second magnet is coupled to the first and second legs of the second magnetic body from the opening side,
wherein the first magnet is magnetized in a direction perpendicular to a magnetization line that is a straight line connecting the vertex of the first magnetic body and a center of a cross section of the first magnet, and the second magnet is magnetized in a direction perpendicular to a magnetization line that is a straight line connecting the vertex of the second magnetic body and a center of a cross section of the second magnet, and
wherein the second magnetic sensor is disposed at a position that is not on the magnetization line in a cross-sectional view of the first magnetic body.

2. The optical element driving device according to claim 1, wherein the second magnetic sensor is disposed, in the cross-sectional view of the first magnetic body, at a position that is not on the magnetization line and not on an imaginary line that extends from the center of the first magnet and intersects the first magnetic body.

3. The optical element driving device according to claim 1, wherein the second magnetic sensor is disposed so that the second magnetic sensor can detect a change in a magnetic force caused by a movement of the first magnet due to the movement of the optical element holder, and
wherein the magnetic force detected by the second magnetic sensor is the same as a magnetic field that couples the first magnet to the first magnetic body, and the first magnet that generates the magnetic field serves as a slide member.

4. An optical element barrel comprising:
an optical element holder that holds an optical element;
a first magnet for moving the optical element holder;
a second magnet for moving the optical element holder in a direction that is perpendicular to a direction in which the first magnet moves the optical element holder;

a first magnetic body and a second magnetic body each having a cross section including a vertex and first and second legs extending from the vertex, the first and second legs having substantially an identical shape and forming an opening therebetween;

a first piezoelectric element that moves the optical element holder by slidingly moving the first magnetic body by vibrating the first magnet;

a second piezoelectric element that moves the optical element holder by slidingly moving the second magnetic body by vibrating the second magnet;

a first magnetic sensor that detects a position of the optical element holder that is moved by driving the first piezoelectric element; and a second magnetic sensor that detects a position of the optical element holder that is moved by driving the second piezoelectric element, wherein the first piezoelectric element is driven in a state in which the first magnet is coupled to the first and second legs of the first magnetic body from the opening side, and the second piezoelectric element is driven in a state in which the second magnet is coupled to the first and second legs of the second magnetic body from the opening side, wherein the first magnet is magnetized in a direction perpendicular to a magnetization line that is a straight line connecting the vertex of the first magnetic body and a center of a cross section of the first magnet, and the second magnet is magnetized in a direction perpendicular to a magnetization line that is a straight line connecting the vertex of the second magnetic body and a center of a cross section of the second magnet, and wherein the second magnetic sensor is disposed at a position that is not on the magnetization line in a cross-sectional view of the first magnetic body.

5. An image pickup apparatus comprising:

an optical element holder that holds an optical element;

a first magnet for moving the optical element holder;

a second magnet for moving the optical element holder in a direction that is perpendicular to a direction in which the first magnet moves the optical element holder;

a first magnetic body and a second magnetic body each having a cross section including a vertex and first and second legs extending from the vertex, the first and second legs having substantially an identical shape and forming an opening therebetween;

a first piezoelectric element that moves the optical element holder by slidingly moving the first magnetic body by vibrating the first magnet;

a second piezoelectric element that moves the optical element holder by slidingly moving the second magnetic body by vibrating the second magnet;

a first magnetic sensor that detects a position of the optical element holder that is moved by driving the first piezoelectric element; and a second magnetic sensor that detects a position of the optical element holder that is moved by driving the second piezoelectric element, wherein the first piezoelectric element is driven in a state in which the first magnet is coupled to the first and second legs of the first magnetic body from the opening side, and the second piezoelectric element is driven in a state in which the second magnet is coupled to the first and second legs of the second magnetic body from the opening side, wherein the first magnet is magnetized in a direction perpendicular to a magnetization line that is a straight line connecting the vertex of the first magnetic body and a center of a cross section of the first magnet, and the second magnet is magnetized in a direction perpendicular to a magnetization line that is a straight line connecting the vertex of the second magnetic body and a center of a cross section of the second magnet, and wherein the second magnetic sensor is disposed at a position that is not on the magnetization line in a cross-sectional view of the first magnetic body.

\* \* \* \* \*